United States Patent [19]
Ohta

[11] Patent Number: 5,448,692
[45] Date of Patent: Sep. 5, 1995

[54] DIGITAL IMAGE PROCESSING DEVICE INVOLVING PROCESSING OF AREAS OF IMAGE, BASED ON RESPECTIVE CONTOUR LINE TRACES

[75] Inventor: Junichi Ohta, Yokohama, Japan

[73] Assignee: Ricoh Company, Ltd., Tokyo, Japan

[21] Appl. No.: 858,155

[22] Filed: Mar. 27, 1992

[30] Foreign Application Priority Data

Mar. 27, 1991 [JP] Japan ................... 3-062337

[51] Int. Cl.⁶ .......................................... G06K 9/48
[52] U.S. Cl. ................................. 395/147; 382/197; 382/199
[58] Field of Search ............... 395/147, 161, 140, 129, 395/134, 133; 382/22, 21

[56] References Cited

U.S. PATENT DOCUMENTS

| | | | |
|---|---|---|---|
| 4,763,119 | 8/1988 | Matsubara et al. | 395/133 |
| 4,908,872 | 3/1990 | Toriu et al. | 382/22 |
| 5,050,222 | 9/1991 | Lee | 382/21 X |
| 5,065,344 | 11/1991 | Kishimoto et al. | 395/134 |
| 5,091,967 | 2/1992 | Ohsawa | 382/22 X |
| 5,103,488 | 4/1992 | Gemello et al. | 382/22 X |
| 5,119,439 | 6/1992 | Osawa et al. | 382/22 |
| 5,202,928 | 4/1993 | Tomita et al. | 382/22 X |
| 5,278,950 | 1/1994 | Takei et al. | 395/161 X |

*Primary Examiner*—Heather R. Herndon
*Assistant Examiner*—Cliff Vo
*Attorney, Agent, or Firm*—Popham, Haik, Schnobrich & Kaufman, Ltd.

[57] ABSTRACT

An image processing device incorporated in a digital image forming apparatus and capable of effecting various kinds of digital image processing, e.g., erasing, italicizing and shadowing, and blanking with a particular area of an image. Considering the fact that frame lines included in a document image can replace marks to be entered by a marker pen, the image processing device extracts areas each being delimited by a frame line as candidates for image processing.

14 Claims, 26 Drawing Sheets

|  | GOODS 1 | GOODS 2 | TOTAL |
|---|---|---|---|
| MAIN | 1,000 | 2,000 | 3,000 |
| BRANCH | 1,000 | 1,000 | 2,000 |
| TOTAL | 2,000 | 3,000 | 5,000 |

~32

|  | GOODS 1 | GOODS 2 | TOTAL |
|---|---|---|---|
| MAIN |  |  |  |
| BRANCH |  |  |  |
| TOTAL |  |  |  |

|  | GOODS 1 | GOODS 2 | TOTAL |
|---|---|---|---|
| MAIN | 1,000 | 2,000 | 3,000 |
| BRANCH | 1,000 | 1,000 | 2,000 |
| TOTAL | 2,000 | 3,000 | 5,000 |

Fig. 11A

| | | | GOODS 1 | | GOODS 2 | | GOODS 3 | |
|---|---|---|---|---|---|---|---|---|
| | | | #1 | #2 | #1 | #2 | #1 | #2 |
| TOKYO | A | 1 | 100 | 20 | 24 | 55 | 38 | 40 |
| | | 2 | 24 | 77 | 56 | 39 | 92 | 44 |
| | B | 1 | 34 | 80 | 61 | 88 | 27 | 50 |
| | | 2 | 72 | 33 | 60 | 78 | 30 | 42 |
| OSAKA | A | 1 | 89 | 40 | 50 | 61 | 44 | 47 |
| | | 2 | 82 | 20 | 61 | 70 | 39 | 42 |
| | B | 1 | 56 | 23 | 55 | 72 | 40 | 43 |
| | | 2 | 85 | 37 | 58 | 68 | 38 | 50 |

|  |  |  | GOODS 1 | | GOODS 2 | | GOODS 3 | |
|---|---|---|---|---|---|---|---|---|
|  |  |  | #1 | #2 | #1 | #2 | #1 | #2 |
| TOKYO | A | 1 | | | | | | |
|  |  | 2 | | | | | | |
|  | B | 1 | | | | | | |
|  |  | 2 | | | | | | |
| OSAKA | A | 1 | | | | | | |
|  |  | 2 | | | | | | |
|  | B | 1 | | | | | | |
|  |  | 2 | | | | | | |

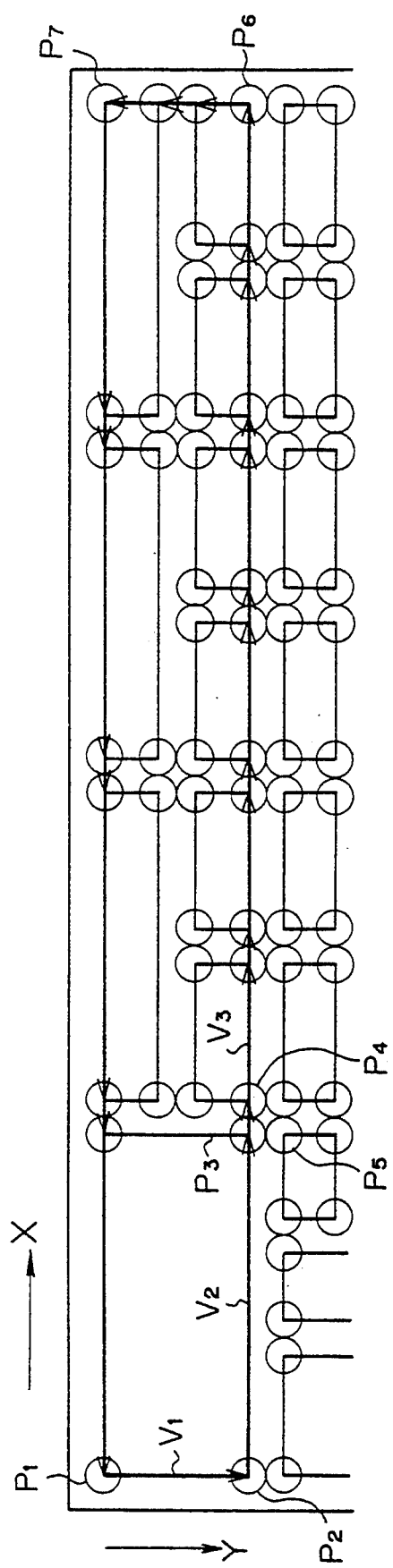

| | | | GOODS 1 | | GOODS 2 | | GOODS 3 | |
|---|---|---|---|---|---|---|---|---|
| | | | #1 | #2 | #1 | #2 | #1 | #2 |
| TOKYO | A | 1 | 100 | 20 | 24 | 55 | 38 | 40 |
| | | 2 | 24 | 77 | 56 | 39 | 92 | 44 |
| | B | 1 | 34 | 80 | 61 | 88 | 27 | 50 |
| | | 2 | 72 | 33 | 60 | 78 | 30 | 42 |
| OSAKA | A | 1 | 89 | 40 | 50 | 61 | 44 | 47 |
| | | 2 | 82 | 20 | 61 | 70 | 39 | 42 |
| | B | 1 | 56 | 23 | 55 | 72 | 40 | 43 |
| | | 2 | 85 | 37 | 58 | 68 | 38 | 50 |

47

|  |  |  | GOODS 1 | | GOODS 2 | | GOODS 3 | |
|---|---|---|---|---|---|---|---|---|
|  |  |  | #1 | #2 | #1 | #2 | #1 | #2 |
| TOKYO | A | 1 |  |  |  |  |  |  |
|  |  | 2 |  |  |  |  |  |  |
|  | B | 1 |  |  |  |  |  |  |
|  |  | 2 |  |  |  |  |  |  |
| OSAKA | A | 1 |  |  |  |  |  |  |
|  |  | 2 |  |  |  |  |  |  |
|  | B | 1 |  |  |  |  |  |  |
|  |  | 2 |  |  |  |  |  |  |

| CONTOUR NO. | START X | START Y | LENGTH X | LENGTH Y | INNER/OUTER |
|---|---|---|---|---|---|
| 1 | i1-1 | j1 | 14 | 11 | OUTER |
| 2 | i2-1 | j2 | 10 | 9 | INNER |
| | | | | | |

3

| DECISION |
|---|
| GRAPHIC |
| TEXT |
| NOISE |
| GRAPHIC |
| . |
| . |

3

DIGITAL IMAGE PROCESSING DEVICE INVOLVING PROCESSING OF AREAS OF IMAGE, BASED ON RESPECTIVE CONTOUR LINE TRACES

BACKGROUND OF THE INVENTION

The present invention relates to an image processing device incorporated in a digital copier, facsimile transceiver or similar digital image forming apparatus for effecting various kinds of digital image processing, e.g., erasing, italicizing and shadowing, and blanking with any desired area of an image.

To effect image processing with a particular area of an image, a prerequisite with the above-described type of image processing device is that the particular area to be processed and the content of processing be recognized. Some different methods have heretofore been proposed for such recognition, as enumerated below:

(1) a method which determines contour data of a mark entered by a marker pen selects a pair of outer and inner contour loops as areas which may be processed while regarding the others inputs as commands, and recognizes the kind of the commands;

(2) a method which causes an operator to enter a desired area and a command by a marker pen and executes image processing with the desired area according to the command;

(3) a method which stores mark information entered in two colors in a memory and extracts area information out of one of the mark information while obtaining processing content information out of the other mark information; and (4) a method which separates continuous pixels from mark information to thereby determine whether a desired image is a line image having area information or a text image having processing content information.

All the conventional methods, however, are not practicable unless marks are directly entered on documents by a marker pen, smearing documents. Therefore, such methods are not applicable to important documents.

When it is desired to erase image information representative of, for example, a table of a document except for title areas, the areas other than the title areas may be erased by a correcting liquid, instead of being marked by a marker pen. To italicize, blank, shadow or otherwise process title areas, for example, a document with such an image may be prepared independently of a desired document and then cut and adhered to the areas of interest of the desired document. While this kind of procedure does not need a marker pen, it simply retouches the desired document itself and, therefore, cannot be practiced without damaging the document.

SUMMARY OF THE INVENTION

It is therefore an object of the present invention to provide a digital image processing device capable of effecting digital image processing with a desired area of a document image without smearing or otherwise damaging a document.

In accordance with the present invention, an image processing device for writing a digital image representative of a document image and produced by image inputting means in storing means, executing digital image processing with the digital image stored in the storing means by image processing means, and feeding the processed digital image to image outputting means includes area recognizing means having contour tracing means for tracing contour lines included in the image to produce image contour information, text/graphic discriminating means for determining whether the image is a text image or a graphic image on the basis of the size of the contour of each portion of the image represented by the image contour information, inclusion relation determining means for determining, when the image is a graphic image, an inclusion relation between an outer contour and an inner contour to thereby associate the outer contour and inner contour with each other, and area extracting means for extracting areas each being delimited by a frame line on the basis of the inclusion relation determined. The device further includes selecting means for allowing an operator to select desired one of the areas and the content of desired processing.

BRIEF DESCRIPTION OF THE DRAWINGS

The above and other objects, features and advantages of the present invention will become more apparent from the following detailed description taken with the accompanying drawings in which:

FIGS. 11A-11D are indicative of a sequence of area recognizing and image processing steps particular to the fifth embodiment;

FIGS. 12A and 12B show a procedure for recognizing a table structure particular to the fifth embodiment;

Figures 16, 17, 18:
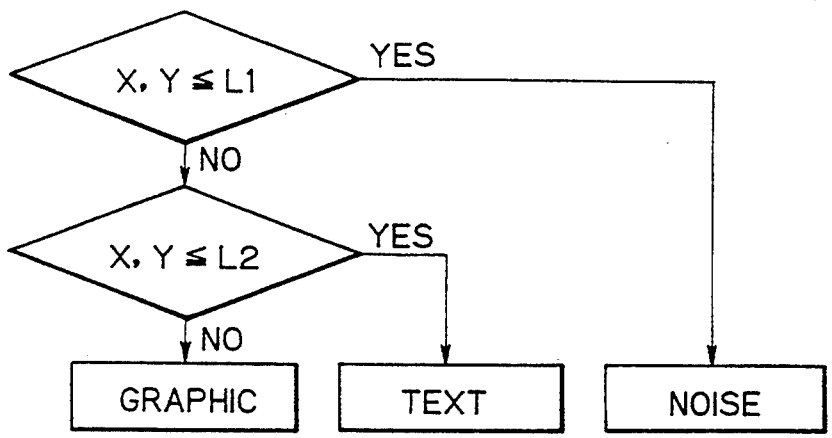
Figure 19:
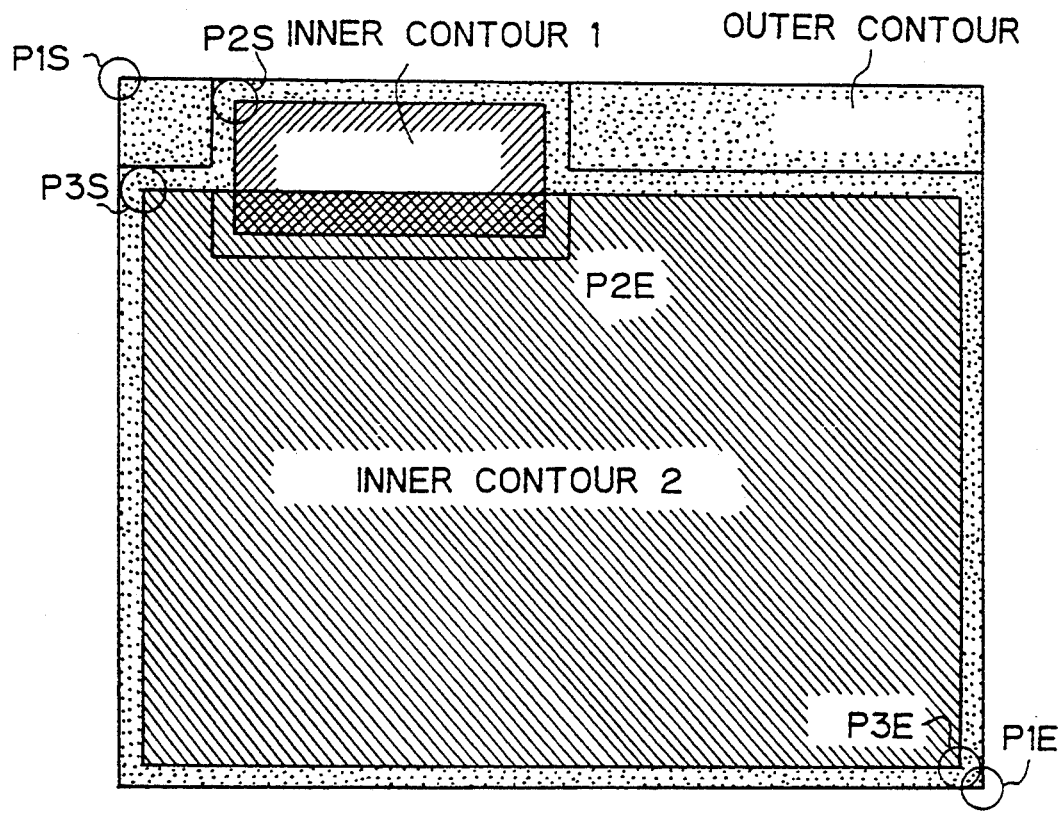
Figure 20:
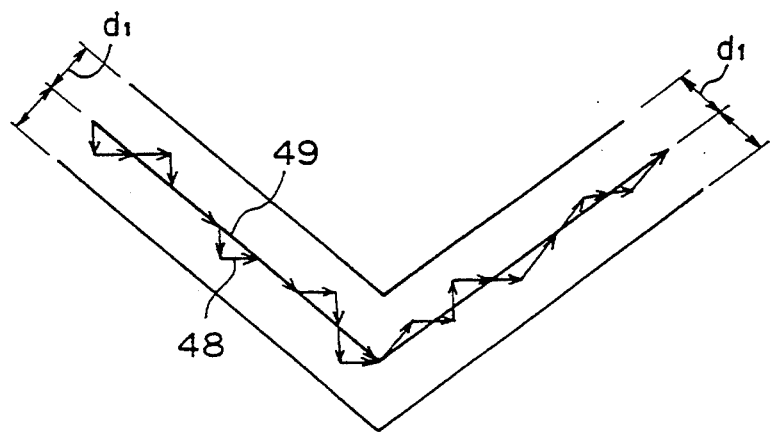
Figure 21:
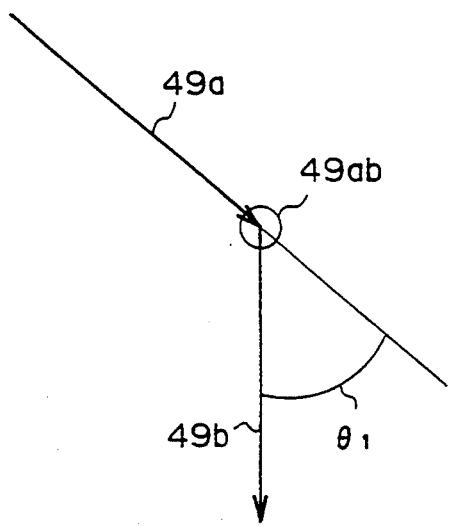
Figure 22:
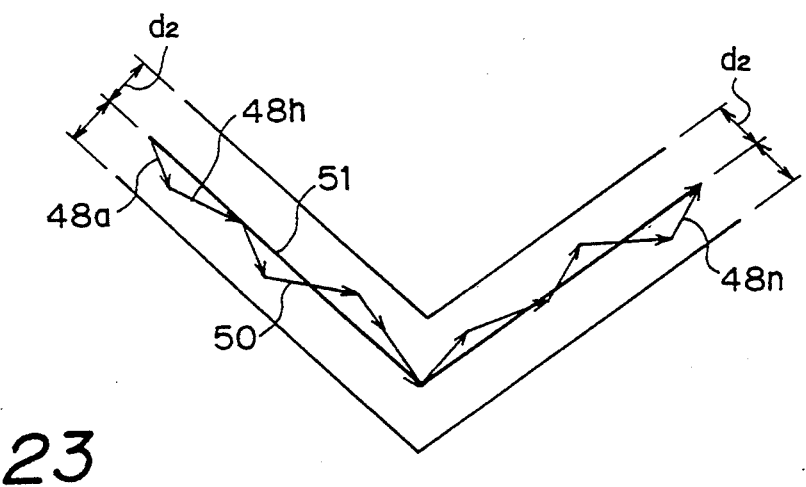

FIGS, 15A and 15B are a schematic representation of a contour tracing procedure included in the embodiment;

FIG. 16 is a RAM (Random Access Memory) map showing a specific condition in which the result of contour tracing is stored in accordance with the present invention;

FIG. 17 is a flow chart representative of a text/graphic discriminating procedure of the present invention;

FIG. 18 is a RAM map showing a specific condition in which the result of text/graphic decision is stored in accordance with the present invention;

FIG. 19 is a schematic representation of a procedure for determining an inclusion relation in accordance with the present invention;

FIG. 20 shows contour vector processing of the present invention;

FIG. 21 shows characteristic point extraction processing of the present invention;

FIG. 22 shows a vector correction procedure of the present invention; and

Figure 23:
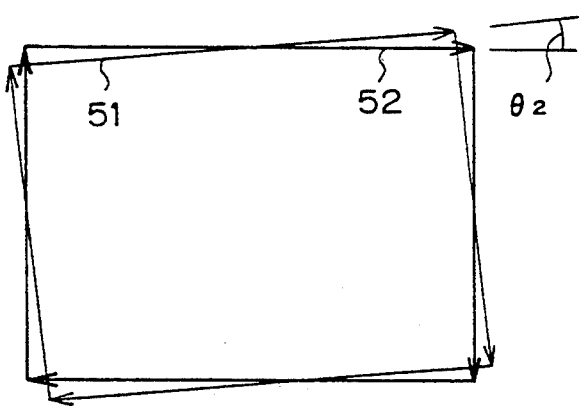

FIG. 23 shows another vector correction procedure available with the present invention.

DESCRIPTION OF THE PREFERRED EMBODIMENTS

Preferred embodiments of the digital image processing device in accordance with the present invention will be described hereinafter.

FIRST EMBODIMENT

Figure 1:
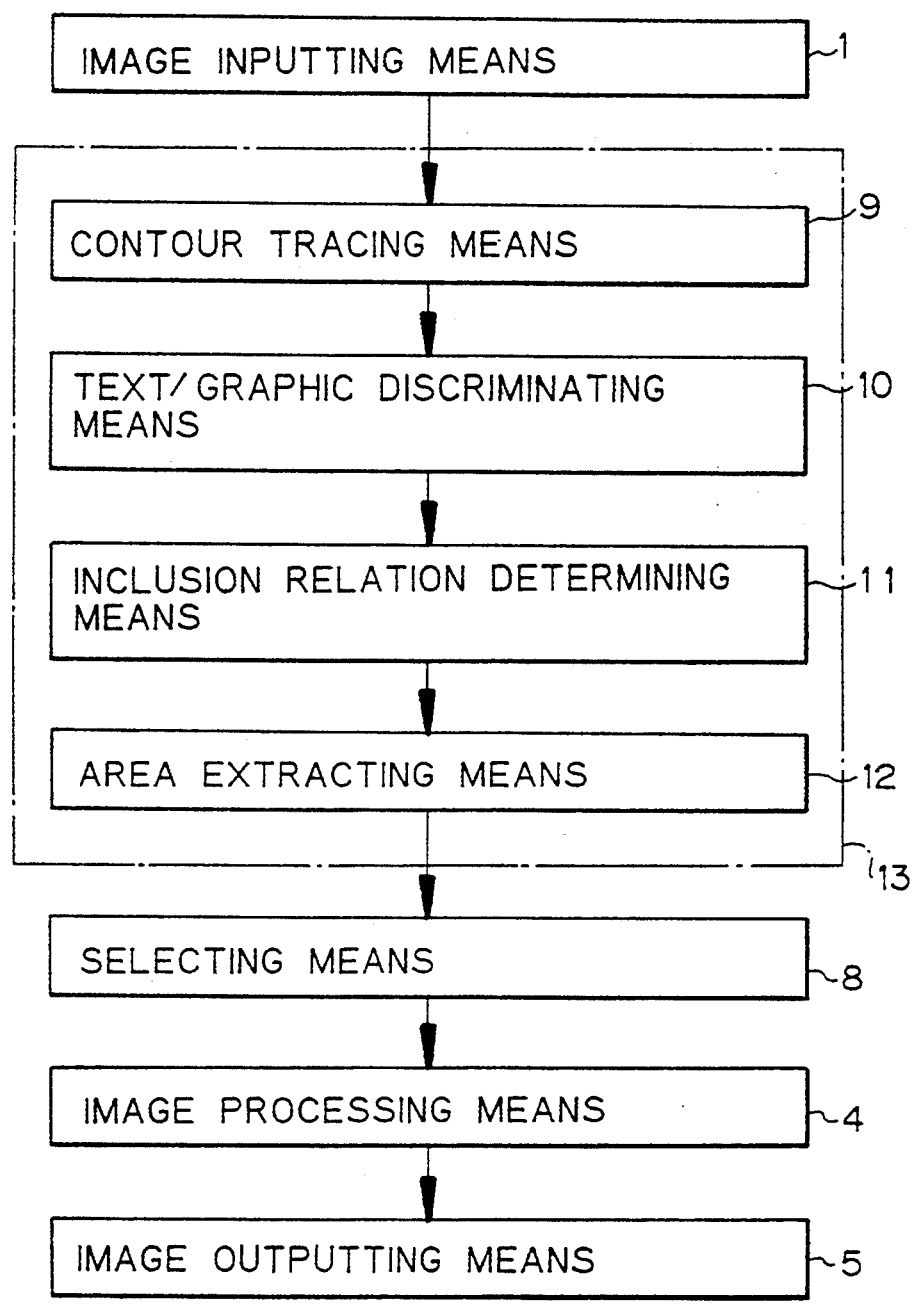
FIG. 1 is a block diagram schematically showing essential part of a first embodiment of the digital image processing device in accordance with the present invention.
Figure 2:
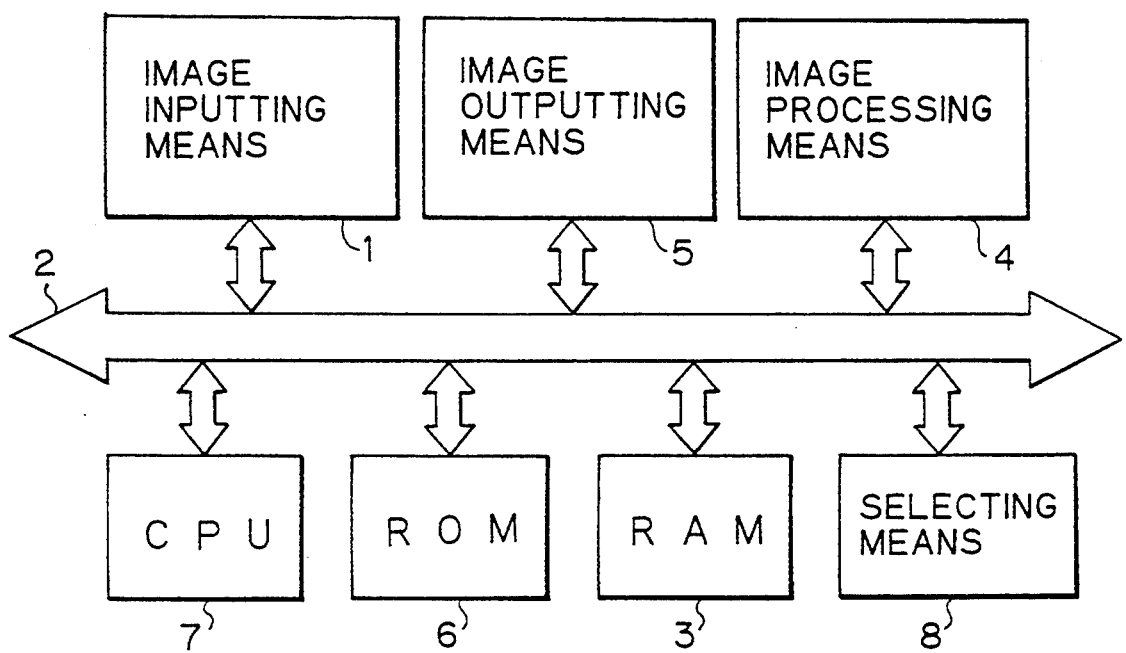
FIG. 2 is a block diagram schematically showing the general construction of the embodiment.

Referring to FIGS. 1, 2 and 3A–3E, an image processing device embodying the present invention is shown. As shown in FIG. 2, the image processing device has image inputting means 1 for optically reading a document image and converting it to bilevel digital image data. The image inputting means 1 may be implemented as a scanner. The digital image data is written to a RAM (Random Access Memory), or storing means, 3 via a bus 2. Image processing means 4 executes various kinds of image processing with the image stored in the RAM 3 and then writes the processed image again in the RAM 3. The processed image is transferred from the RAM 3 to a printer, CRT (Cathode Ray Tube) or similar image outputting means 5 to be produced as a hard copy or to be displayed on a screen. A CPU (Central Processing Unit) 7 controls the above-mentioned means 1, 4 and 5 by executing programs stored in a ROM (Read Only Memory) 6. The RAM 3 is used as a work area also. Selecting means 8 is constituted by, for example, a keyboard, numeral keys, and a stylus pen and also connected to the bus 2 for entering various kinds of messages from the user.

FIG. 1 shows functional blocks for executing area recognition which is the characteristic feature of the embodiment and mainly executed by the CPU 7. As shown, area recognizing means 13 is made up of contour tracing means 9, text/graphic discriminating means 10, inclusion relation determining means 11, and area extracting means 12. The contour tracing means 9 traces the contour lines of the input image to produce contour information. The text/graphic discriminating means 10 determines whether the image of interest is a text image or a graphic image on the basis of the size of contours represented by the contour information. The inclusion relation determining means 11 determines, when the image is a graphic image, an inclusion relation between the outer and inner contours of the image to thereby associate the two contours with each other. The area extracting means 12 extracts areas on the basis of the inclusion relation determined by the determining means 11.

As shown in FIG. 3, assume a document image including frame lines 14. Then, the contour tracing means 9 sequentially traces the contour lines of black pixels of the image stored in the RAM 3 to thereby extract contour line loops (how to trace contours will be described later). The text/graphic discriminating means 10 compares the size of each contour line loop extracted with a predetermined threshold to determine whether the input image is a text image or a graphic image (how to discriminate text and character images will be described later). FIG. 3B shows contours which will appear when the frame lines 14 are determined to represent a graphic image. The contours shown in FIG. 3B are made up of an outer contour 15 and inner contours 16 and 17. The inclusion relation determining means 11 examines the relation between the outer contour 15 and the inner contours 16 and 17 with respect to inclusion, thereby associating them with each other. While a method of determining such a relation will be described later, the inner contours 16 and 17 shown in FIG. 3B are determined to be included in the outer contour 15. Based on such a correspondence, the area extracting means 12 extracts areas 1 and 2 (shown in FIG. 3C) surrounded by the inner contours 16 and 17, respectively, as candidates for image processing. In this way, the areas of the document image surrounded by the frame lines 14 are automatically extracted.

Figure 3A:
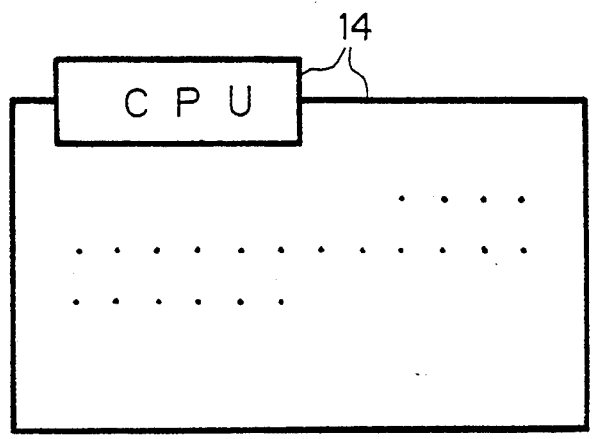
FIGS. 3A-3E demonstrate a sequence of area recognizing and image processing steps particular to the embodiment.
Figure 3B:
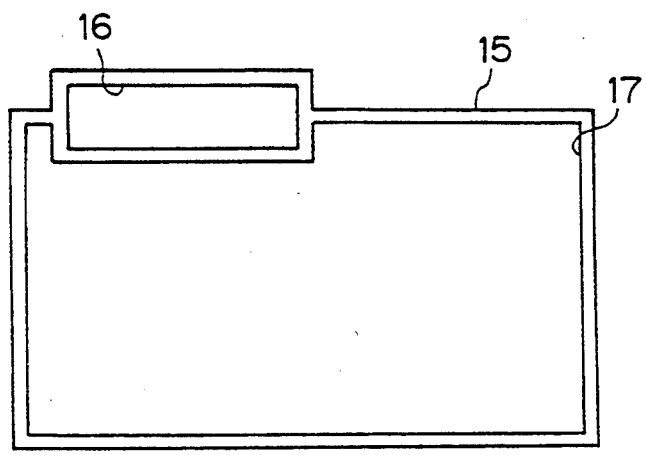
Figure 3C:
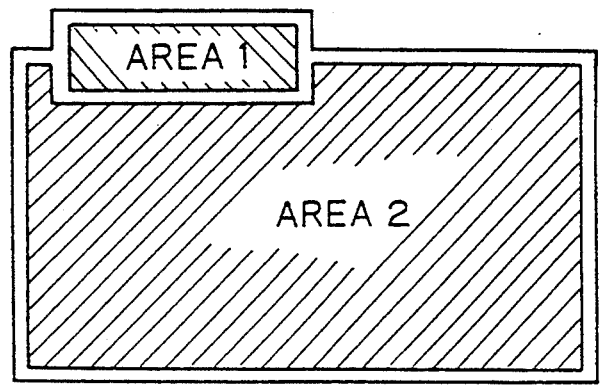
Figure 3D:
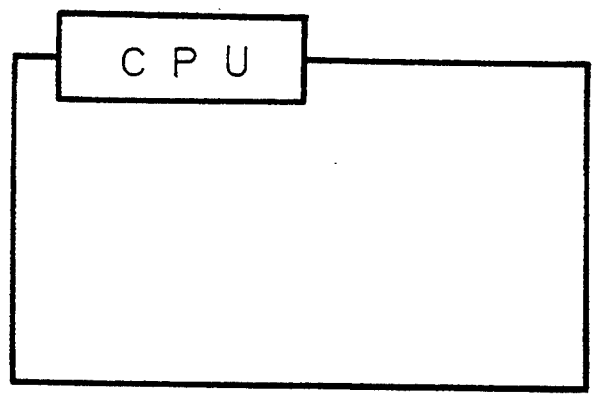
Figure 3E:
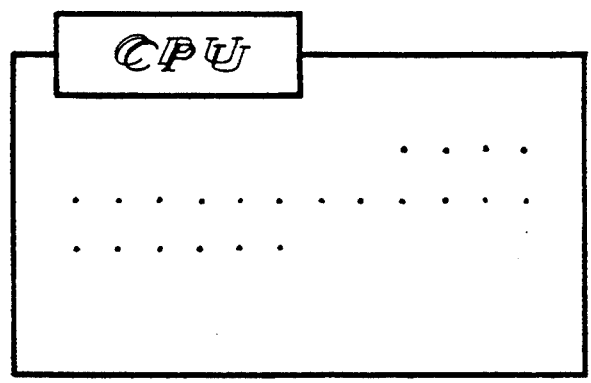
Figure 4:
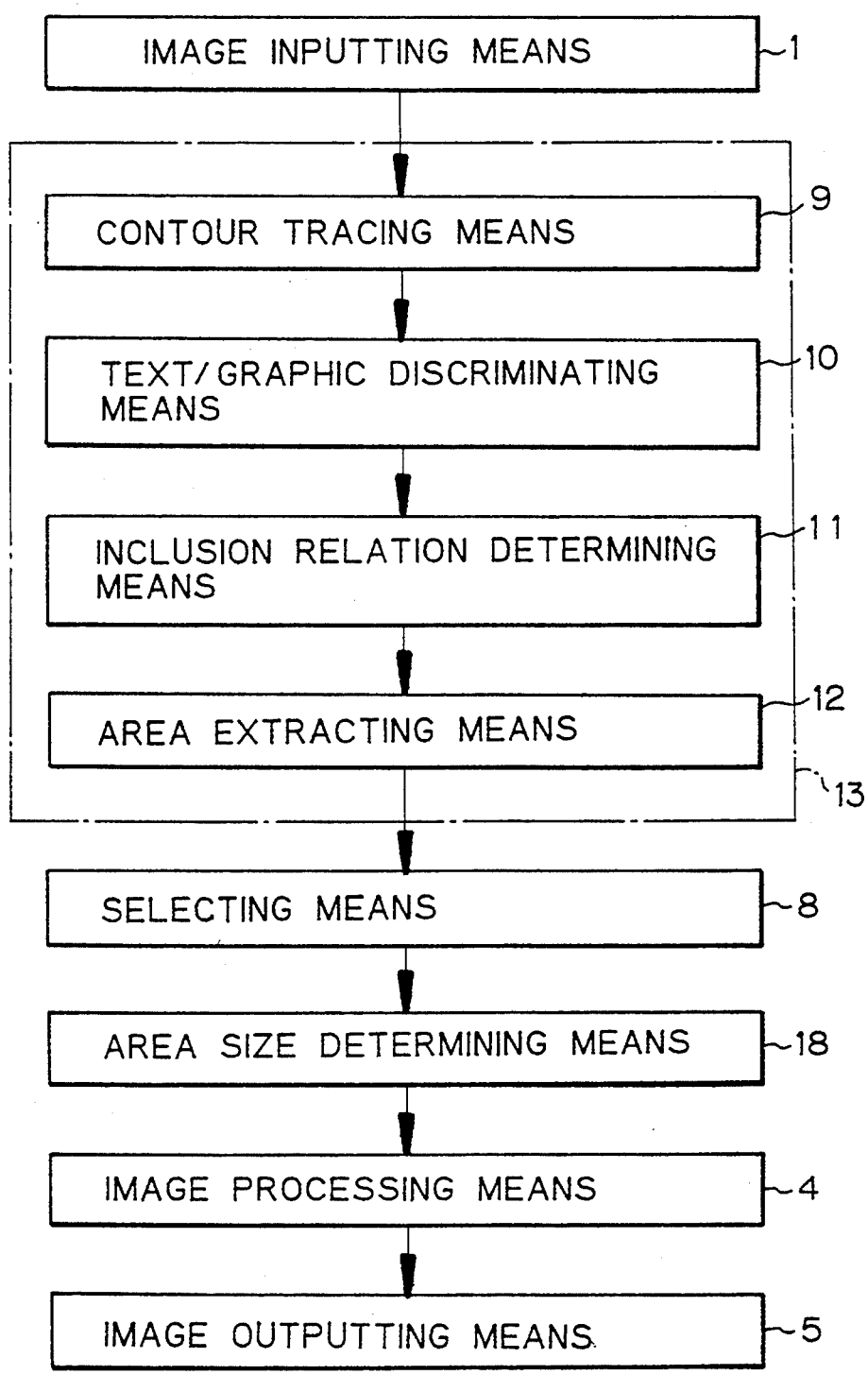
FIG. 4 is a block diagram schematically showing essential part of a second embodiment of the present invention.

As the operator enters desired one of the areas 1 and 2 and the content of desired processing on the selecting means 8, the image processing means 4 executes the designated processing with the designated area 1 or 2. Then, the image outputting means 5 prints out the processed image on a paper sheet or otherwise outputs such an image. FIGS. 3D and 3E show respectively an output image having part thereof inside of the area 2 erased and an output image having part thereof inside of the area 1 italicized and shadowed.

SECOND EMBODIMENT

FIGS. 4 and 5A–5D show an alternative embodiment of the present invention. As the number of extracted areas each being delimited by a frame line increases, the first embodiment will increase the number of items which should be selected on the selecting means, degrading the operability. In light of this, the second embodiment determines the size, i.e., area of an area defined by an inner contour by calculation and allows the operator to select a desired area or an undesired area in terms of size. For this purpose, the selecting means 8 in this embodiment is provided with area size determining means 18.

Figure 5A:
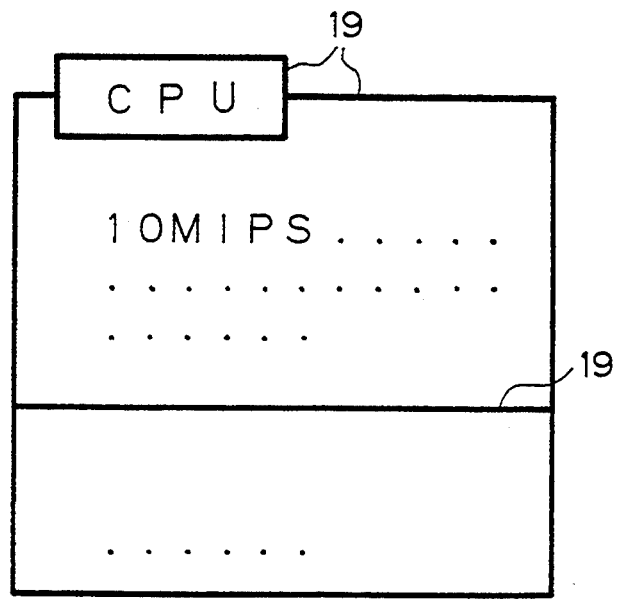
FIGS. 5A-5D shows a sequence of area recognizing and image processing steps particular to the second embodiment.
Figure 5B:
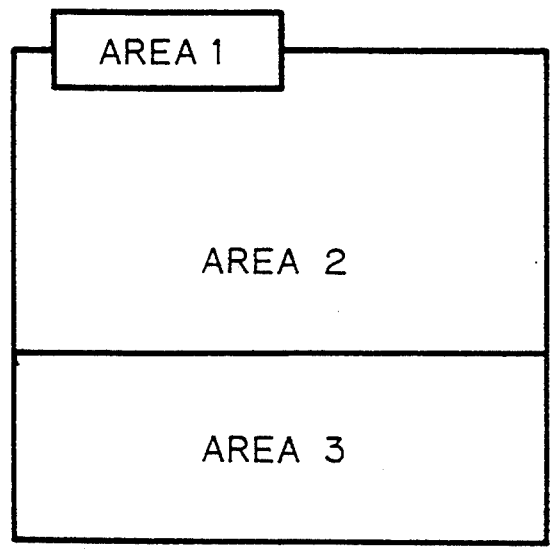
Figure 5C:
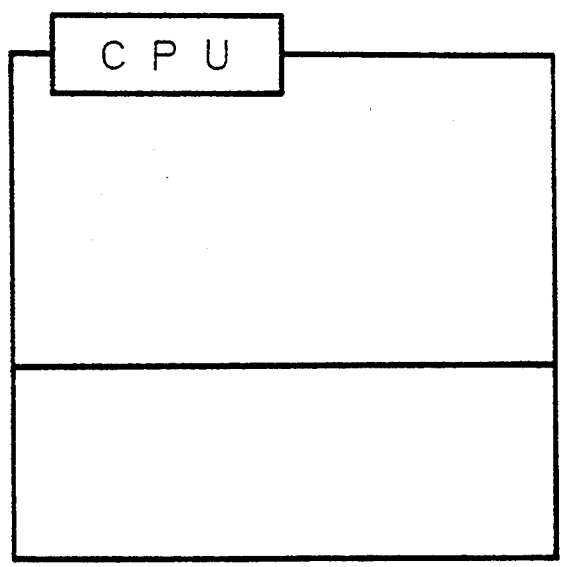
Figure 5D:
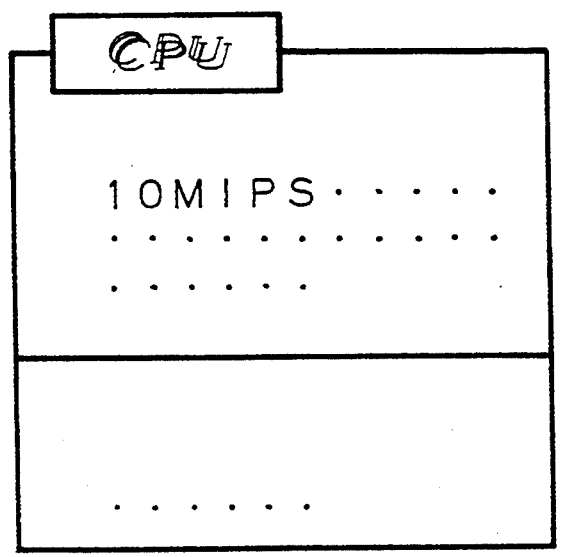
Figure 6:
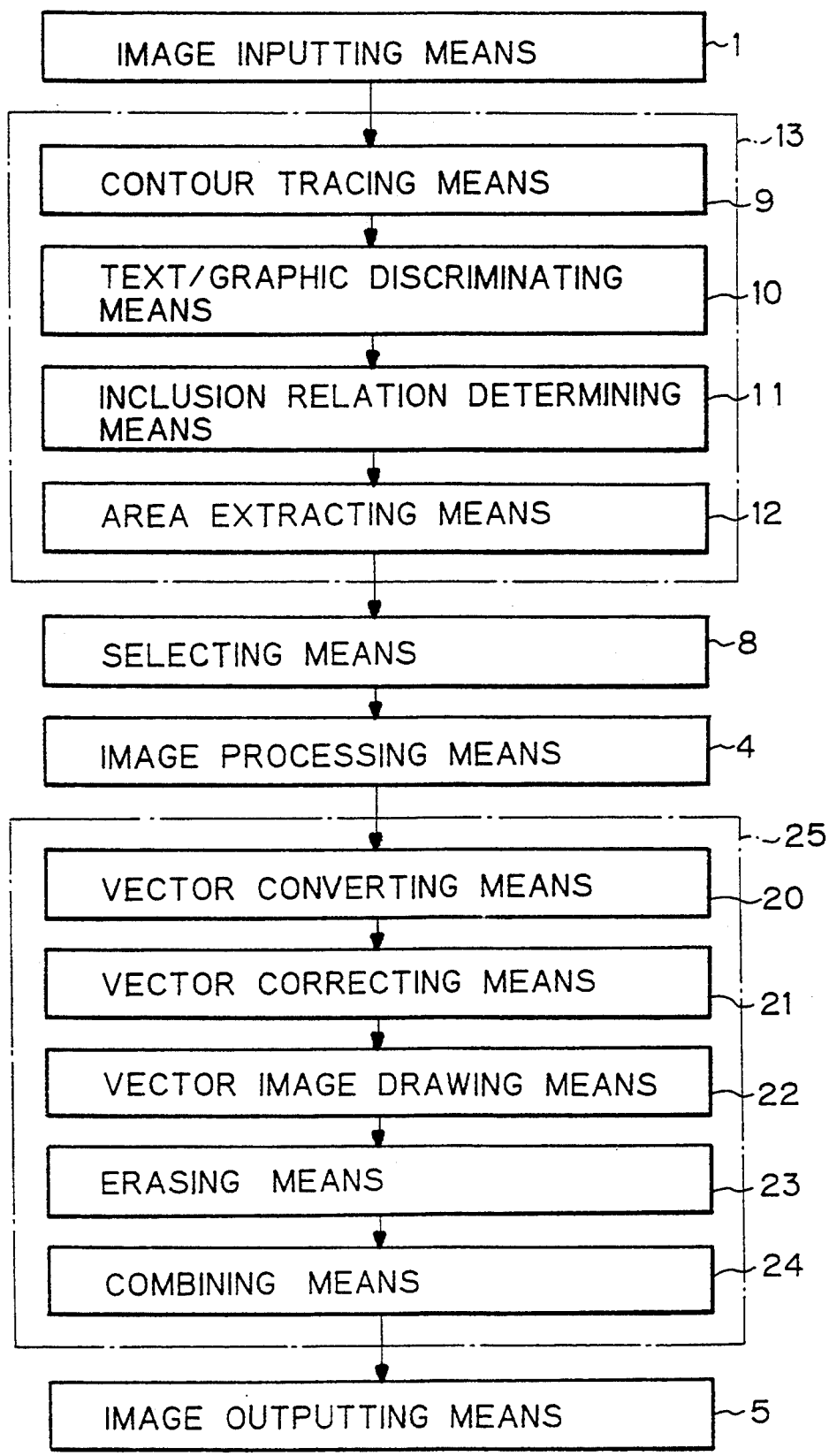
FIG. 6 is a block diagram schematically showing essential part of a third embodiment of the present invention.

Specifically, assume a document image shown in FIG. 5A having frame lines 19. The contour tracing means 9, text/graphic discriminating means 10, inclusion relation determining means 11 and area extracting means 12 execute the same processing as in the first embodiment. As a result, areas 1, 2 and 3 shown in FIG. 5B are extracted. Then, the operator operates the selecting means 8 to enter a desired area by selecting one of "INSIDE OF SMALLEST AREA", "OUTSIDE OF SMALLEST AREA", "INSIDE OF LARGEST AREA" and "OUTSIDE OF LARGEST AREA", while selecting the content of processing. In response, the area size determining means 18 calculates the sizes of the areas 1, 2 and 3 included in the outer contour and then locates the designated area (how to determine the area size will be described later). In the specific image shown in FIGS. 5A–5D, the area 1 is smallest while the area 2 is largest. Thereafter, the image processing means 4 executes the designated image processing with the area of interest and delivers the processed image to the image outputting means 5. FIGS. 5C and 5D show respectively an output image having part thereof outside of the smallest area erased and an output image having part thereof inside of the smallest area italicized and shadowed.

THIRD EMBODIMENT

Referring to FIG. 6 and 7A–7G, another embodiment of the present invention will be described which converts a document image with handwritten frame lines to a fair image. Such a function is attainable with, for example, vector converting means 20, vector correcting means 21, vector image drawing means 22, erasing means 23, and combining means 24 which intervene between the image processing means 4 and the image outputting means 5 shown in FIG. 1. The vector converting means 20 converts frame line images which define areas extracted by the area extracting means 12 to vectors. The vector correcting means 21 corrects the frame line data in the form of vectors so as to absorb the irregularity of handwriting. The vector image drawing means 22 develops the corrected vector data in the RAM 3. The erasing means 23 erases the original frame line image data in the form of vectors from RAM 3. The combining means 24 combines the processed image data from the image processing means 4 and the vector image from the vector image drawing means 22.

Figure 7A:
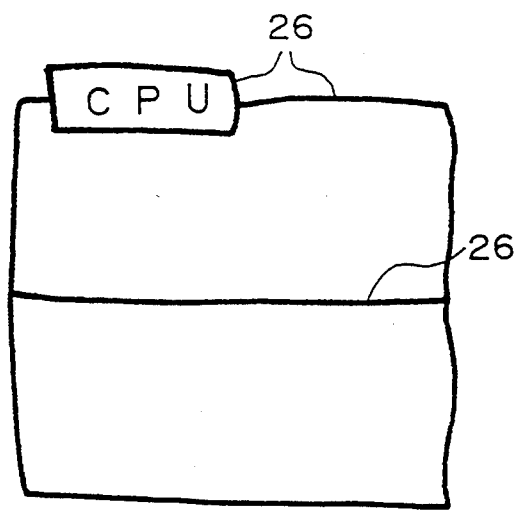
FIGS. 7A-7G demonstrate a sequence of image recognizing and image/processing steps particular to the third embodiment.
Figure 7B:
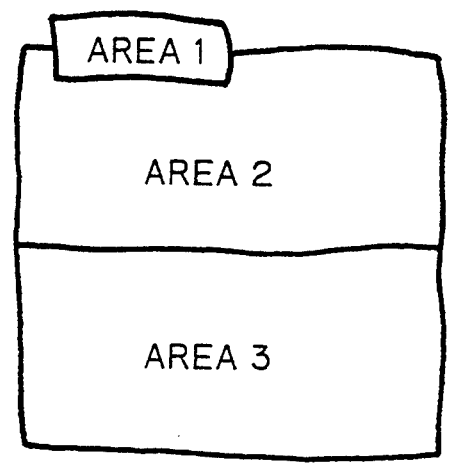
Figure 7C:
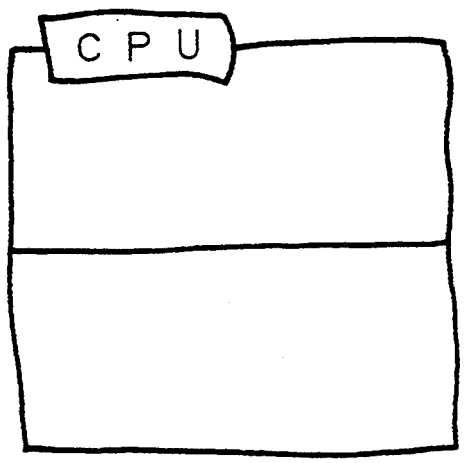
Figure 7D:
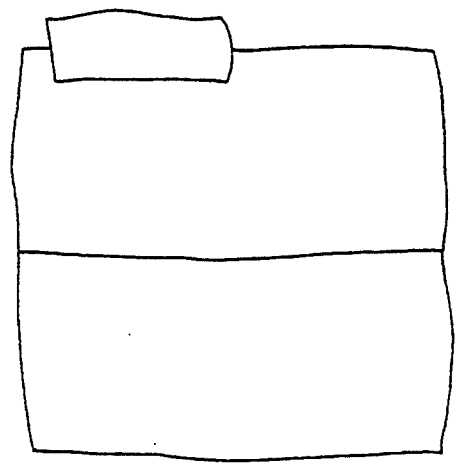
Figure 7E:
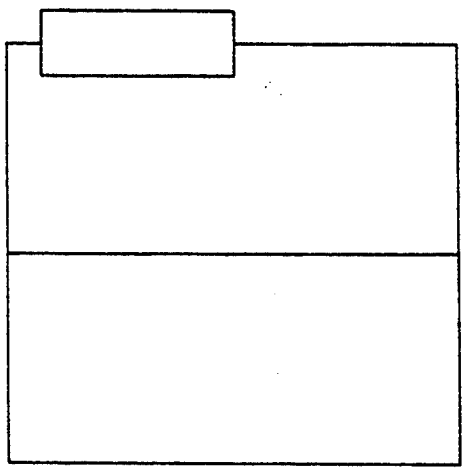

Assume an image shown in FIG. 7A which includes handwritten frame lines 26. Then, the contour tracing means 9, text/graphic discriminating means 1 0, inclusion relation determining means 11 and area extracting means 12 produce areas 1, 2 and 3 shown in FIG. 7B by the previously stated operation. When the operator enters a command for erasing part of the image lying in, for example, the areas 2 and 3 on the selecting means, the image processing means 4 executes the designated processing to produce a result shown in FIG. 7C. The procedure described so far is identical with the procedure of, for example, FIGS. 3A–3E. Subsequently, the result of processing is delivered to the vector converting means 20. In response, the vector converting means 20 converts the frame line image to vectors on the basis of the contour information to thereby produce vector data extending through the center of the frame line image and the width of the frame line image (vector conversion will be described later specifically). In parallel with the vector conversion, the original frame line image is erased in the RAM 3. Thereafter, the vector correcting means 21 corrects the irregularity of the handwritten frame lines 26 to produce corrected contour vectors shown in FIG. 7E (vector correction will be described later).

Figure 7F:
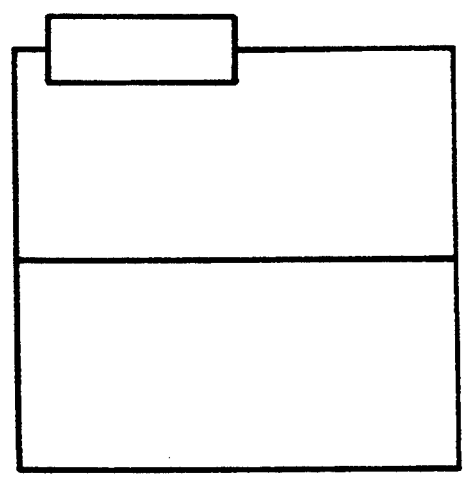
Figure 7G:
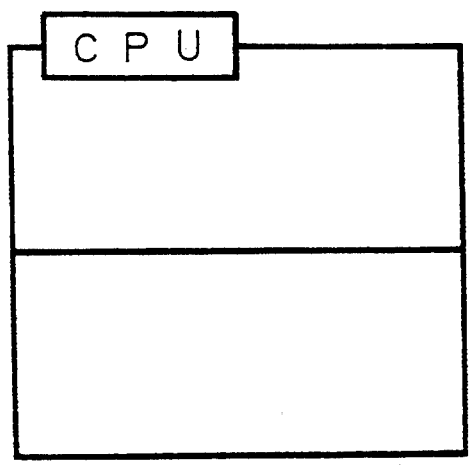

The corrected contour vector data is transferred to the vector image drawing means 22 together with the line width data. In response, the vector image drawing means 22 draws fair contour vectors, as shown in FIG. 7F. The resulting fair vector image is combined with the processed image data by the combining means 24 to output a combined image shown in FIG. 7G.

In the embodiment, the image data whose frame line image has been erased (processed image) and the fair contour vector image are written to another memory and then combined by the combining means 24 to produce an output image. Alternatively, the vector imaging means 22 may also play the role of the combining means 24 and draw a vector image directly in the processed image data. This is successful in omitting the combining means 24 and, therefore, in saving the memory capacity.

FOURTH EMBODIMENT

Figure 8:
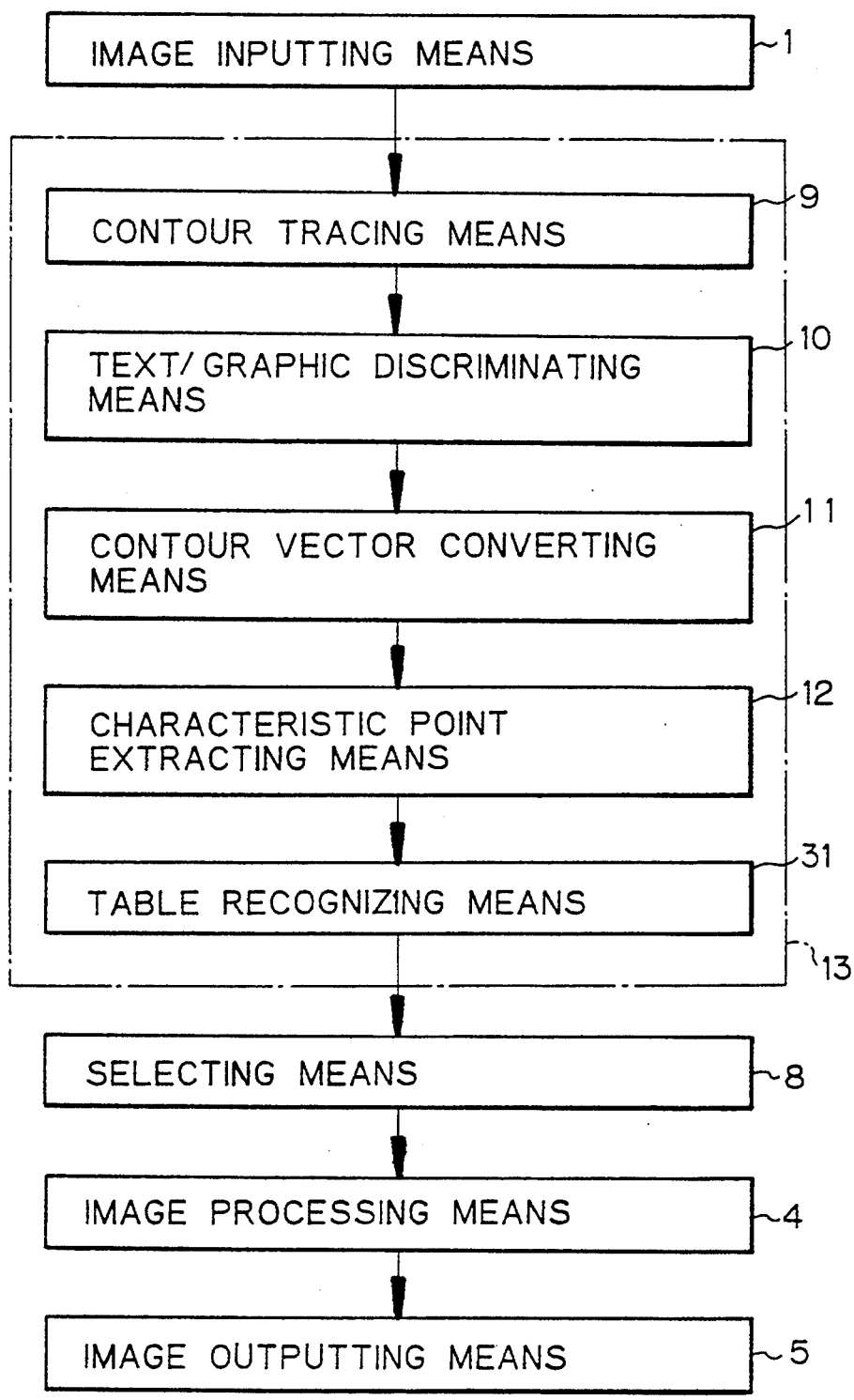
FIG. 8 is a block diagram schematically showing essential part of a fourth embodiment of the present invention.

FIGS. 8 and 9A–9G show a fourth embodiment of the present invention which extracts the frame areas of a table, instead of simply extracting areas defined by frame lines. As shown in FIG. 8, the area recognizing means 13 additionally has a table recognizing means 31 which recognizes a table structure on the basis of a positional relation of areas extracted by the area extracting means 12. Hence, title areas and the other areas constituting a title structure are separated from each other and automatically extracted as candidates for image processing.

Figures 9A, 9B:
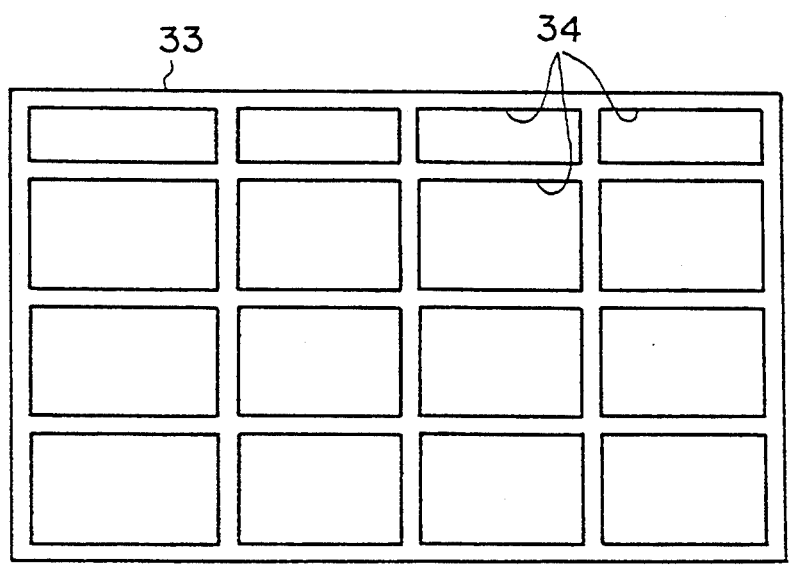
FIGS. 9A-9G are representative of a sequence of image recognizing and image processing steps particular to the fourth embodiment.
Figure 9C:
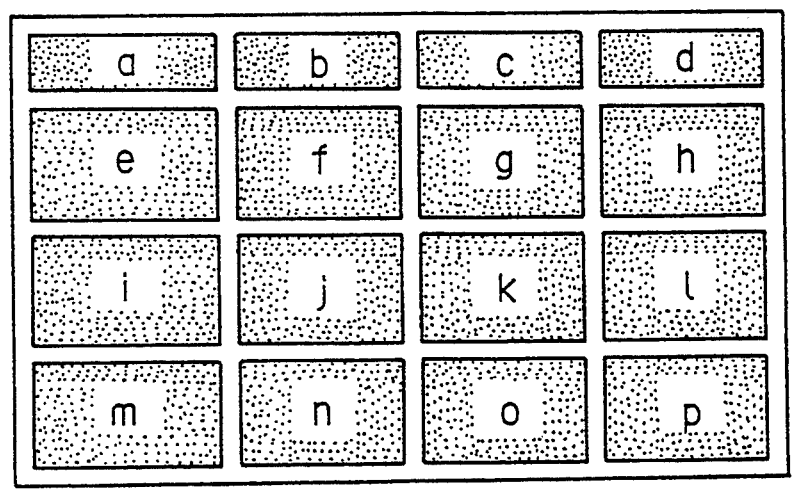
Figure 9D:
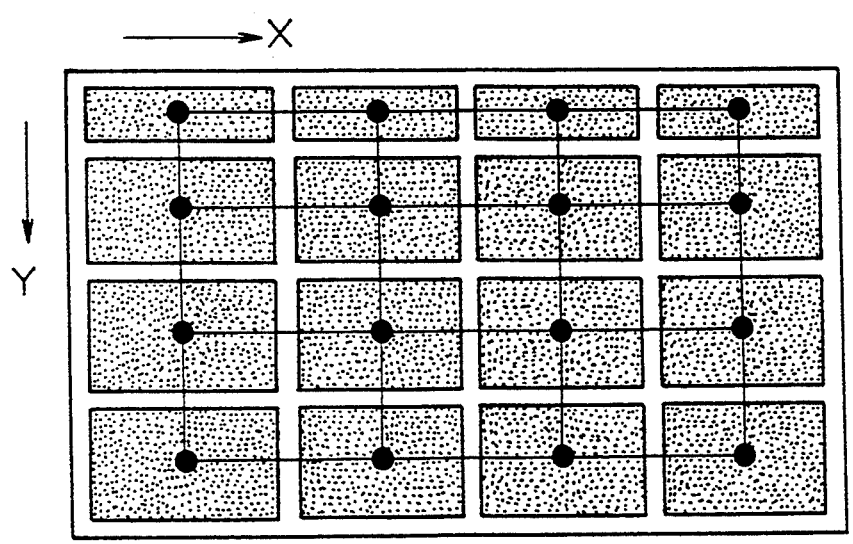

Assume a document image shown in FIG. 9A which includes a table frame 32. Then, the contour tracing means 9 and text/graphic discriminating means 10 perform the previously stated operations to produce contours shown in FIG. 9B, i.e., an outer contour 33 and a number of inner contours 34. Thereafter, the inclusion relation determining means 11 and area extracting means 12 extract the areas delimited by the inner contours 34 as areas a–p, as shown in FIG. 9C. The table recognizing means 31 extract the representative points, e.g. , the gravities of the areas a–p, as represented by dots in FIG. 9D. Then, the table recognizing means 31 recognizes the table structure on the basis of the positional relation of the dots in X and Y directions. On recognizing the table structure, this means 31 determines that the uppermost areas $a$–$d$ and the leftmost areas $a$, $e$, $i$ and $m$ to be a horizontal and a vertical title zone T1 and T2, respectively.

Figures 9E, 9F, 9G:
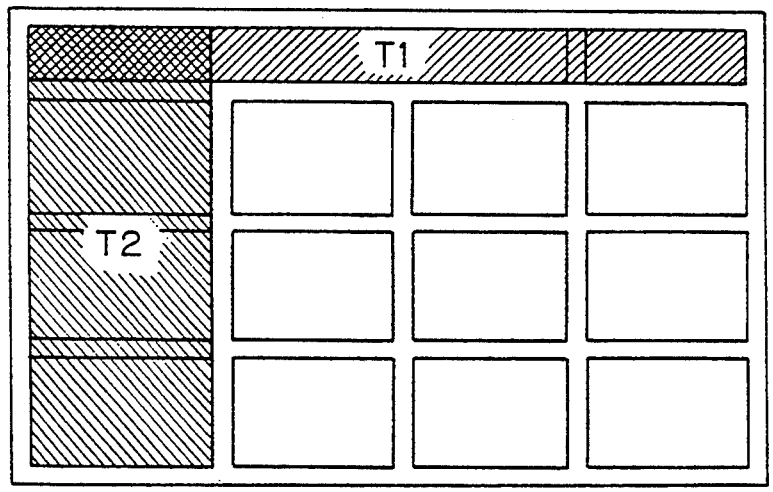

Thereafter, the user enters a desired area to process and the content of desired processing on the selecting means 8. In response, the image processing means 4 executes image processing with the designated area and delivers the resulting image to the image outputting means 5. FIGS. 9F and 9G show respectively a specific output image having part thereof outside of the title zones T1 and T2 erased and a specific output image having part thereof inside of the title zones T1 and T2 italicized and blanked.

FIFTH EMBODIMENT

Figure 10:
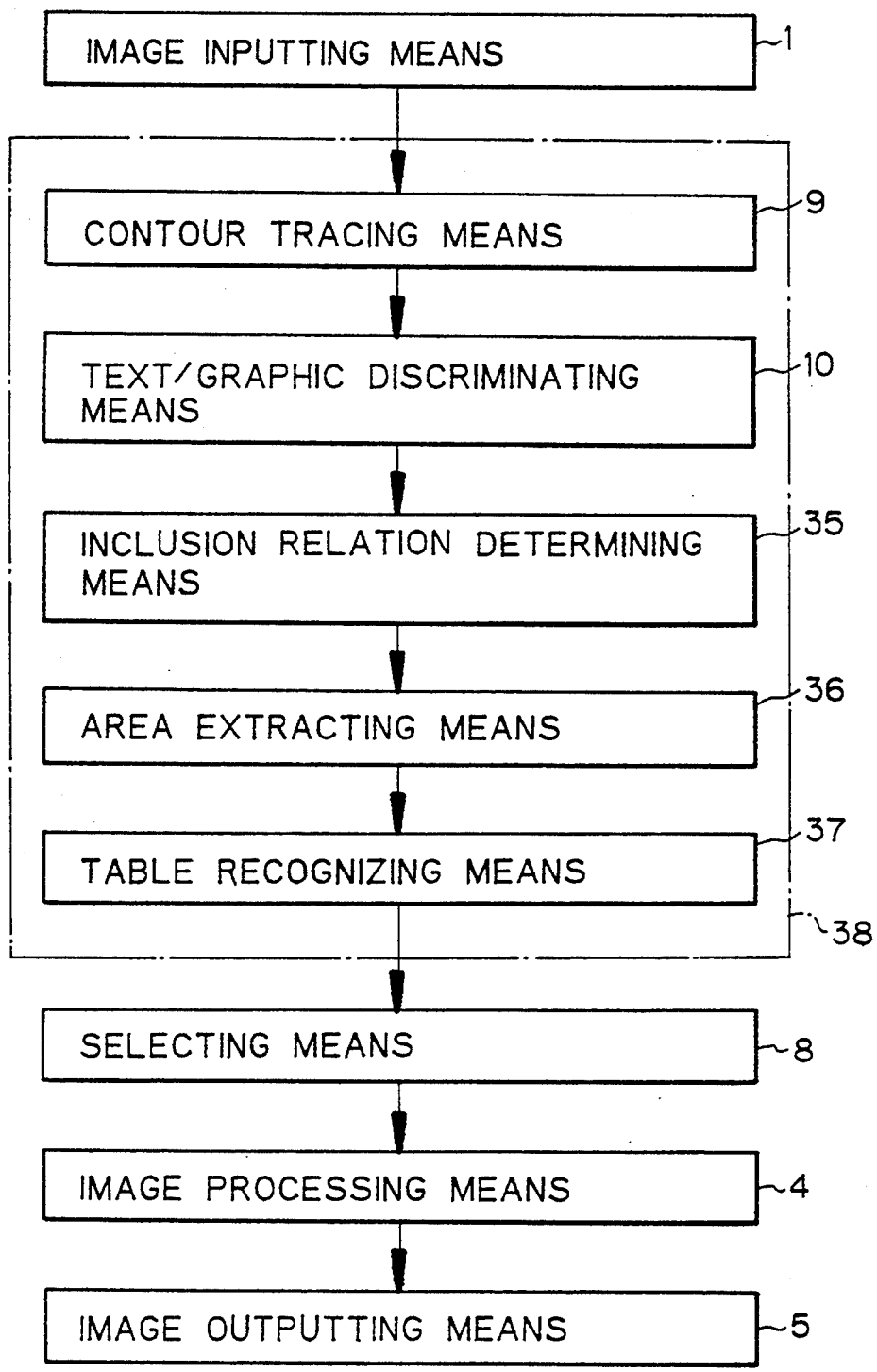
FIG. 10 is a block diagram schematically showing essential part of a fifth embodiment of the present invention.

A reference will be made to FIGS. 10, 11A–11D, 12A and 12B for describing a fifth embodiment of the present invention which determines a relation of areas delimited by frame lines in terms of representative points. While this embodiment is directed toward the recognition of a relatively simple table as shown in FIG. 9A, it is capable of recognizing even a table having a relatively complicated structure. As shown in FIG. 10, an area recognizing means 38 has, in addition to the contour tracing means 9 and text/graphic discriminating means, contour vector converting means 35 for converting the contour data of a graphic image to vectors, characteristic point extracting means 36 for extracting points where the continuity of the resulting contour vectors changes as characteristic points of the contour, and table recognizing means 37 for recognizing a table structure on the basis of the contour vectors and the characteristic points.

Assume a document image shown in FIG. 11A which includes a table frame 39. Then, the contour tracing means 9 and text/graphic discriminating means 10 produce a contour image made up of an outer contour 40 and inner contours 41, as shown in FIG. 11B. On receiving such a result of discrimination, the contour vector converting means 35 converts the contour chain code data representative of the inner contours 41 to vectors by absorbing the digital noise of the contour data. The characteristic point extracting means 36 calculates a change in the angle between successive vectors to thereby extract points where the angle sharply changes as characteristic points (how to extract characteristic points will be described later). Circles shown in FIGS. 12A and 12B indicate such characteristic points. The table recognizing means 37 recognizes a table structure, i.e., the horizontal and vertical title zones TI and T2 on the basis of the contour vector data representative of the inner contours 41 and fed from the contour vector converting means 35 and the characteristic points fed from the characteristic point extracting means 36.

A specific method of recognizing the horizontal title zone T1 is as follows. First, as shown in FIG. 12A, the top left characteristic point $p_1$ of the top left inner contour loop is used as a start point. A contour vector $v_1$ extending from the characteristic point $P_1$ in the Y positive direction is traced to the first characteristic point $p_2$. Then, a contour vector $v_2$ extending from the characteristic point $p_2$ in the X positive direction is traced to find the next characteristic point $p_3$. Characteristic points $P_4$ and $p_5$ are located at positions each being apart from the characteristic point $p_3$ by a distance corresponding to the line width of the table. One, $p_4$, of such two characteristic points which is located on the extension of the current advancing direction and followed by a contour vector $v_3$ on the extension of the current advancing direction is found. Such a sequence is repeated thereafter. The absence of a characteristic point in the same advancing direction means that the processing reached the end of the table frame 39. In FIG. 12A, a characteristic point Ps is representative of the right end of the table frame. The tracing operation advances from the characteristic point $P_6$ in the Y negative direction to the top right characteristic point $P_7$ of the table frame 39 and then to the start point $p_1$ in the X negative direction. The area defined by thick arrows in FIG. 12A is the horizontal title zone T1 (see FIG. 11C).

The above principle is also true with the vertical title zone T2. For example, as shown in FIG. 12B, a vector $v_4$ extending from the start point $p_1$ in the X positive direction is traced to find the first characteristic point $p_8$. Then, a contour vector $v_5$ extending from the characteristic point $p_8$ in the Y positive direction is traced to find a characteristic point $p_9$. Characteristic points $p_{10}$ and $p_{11}$, are located at positions each being spaced apart from the point $P_9$ by a distance corresponding to the line width of the table frame. One, $P_{10}$, of such two characteristic points $p_{10}$ and $p_{11}$ which is located on the extension of the current advancing direction and followed by a contour vector $v_6$ on the extension of the current extending direction is found. Such a procedure is repeated thereafter. The absence of a characteristic point on the same advancing direction means the lower end of the table frame 39. In FIG. 12B, the characteristic point $p_{11}$ is indicative of the lower end of the table frame 39. Subsequently, the tracing operation proceeds from the characteristic point $p_{11}$ in the X negative direction to the bottom left characteristic point $p_{13}$ and then to the start point $p_1$. The area defined by thick arrows is the vertical title area T2 (see FIG. 11C).

Figures 11C, 11D:
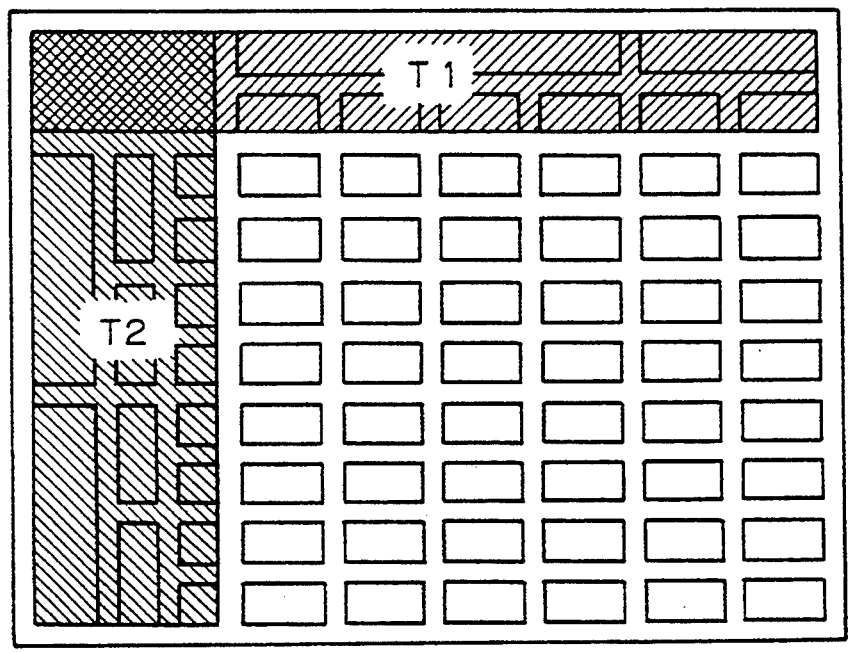
Figure 12B:
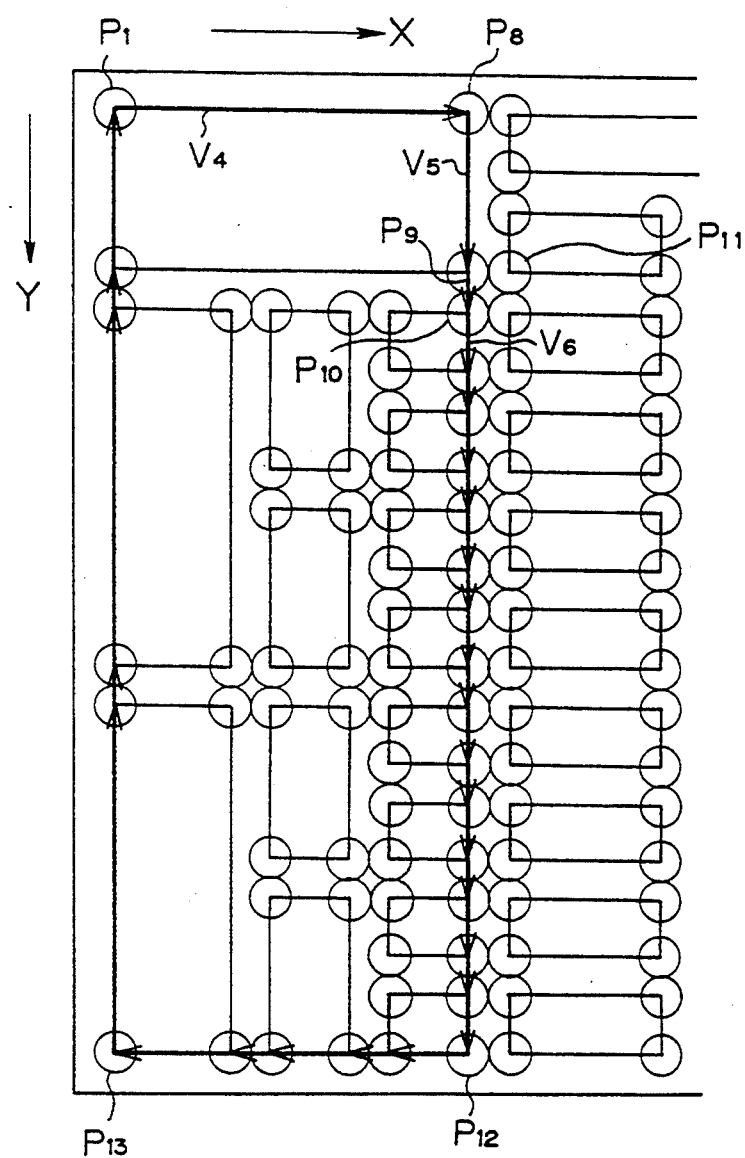

By the above processing, the table recognizing means 37 determines that the table frame 39 shown in FIG. 11A is a table structure having the horizontal and vertical title zones T1 and T2. Then, the operator enters a desired area and the content of desired processing on the selecting means 8. In response, the image processing means 4 processes the designated area in the designated mode and feeds the resulting image to the image outputting means 5. FIG. 11D shows a specific output image having part thereof outside of the title zones T1 and T2 erased.

SIXTH EMBODIMENT

Figure 13:
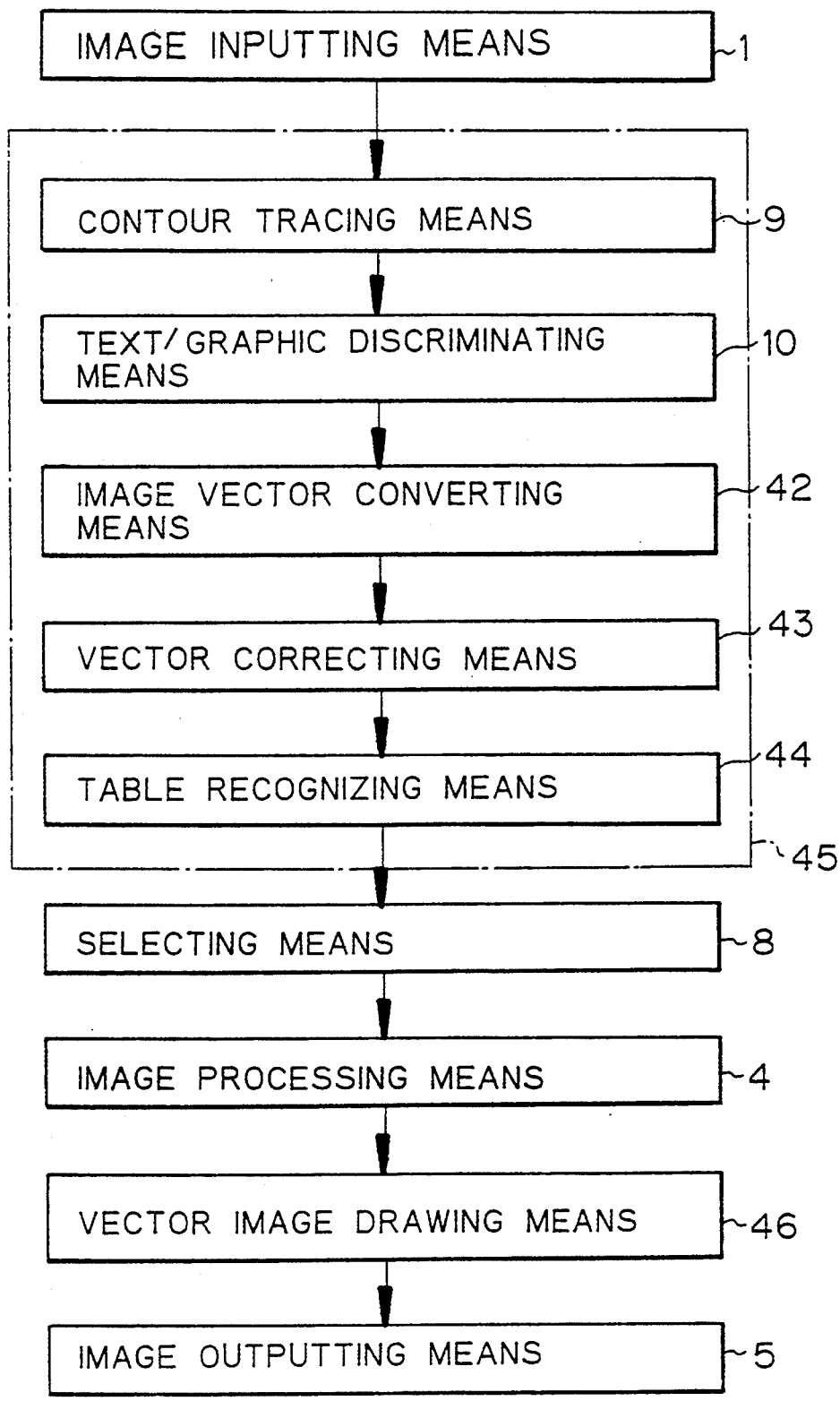
FIG. 13 is a block diagram schematically showing essential part of sixth embodiment of the present invention.

Referring to FIGS. 13 and 14A-14D, a sixth embodiment of the present invention will be described. While this embodiment, like the above embodiment, recognizes even a complicated table structure, it additionally has a function of correcting, for example, a handwritten table frame to produce a fair table frame. In the case of handwritten frame lines, the embodiment converts the frame line image representative of a table frame to vectors, corrects the vectors in such a manner as to absorb irregularity particular to handwriting, and then draws the corrected image. At this instant, the embodiment can draw an image with the original line width or can change the line with and/or the kind of the line. Regarding vector conversion, while the table structure may be recognized by the previously stated method, the embodiment uses vector data representative of a frame line image for the purpose of reducing the amount of data, i.e. , enhancing rapid processing. As shown in FIG. 13, the embodiment has area recognizing means 45 made up of vector means 42, vector correcting means 43 and table recognizing means 44 in addition to the contour tracing means 9 and text/graphic discriminating mean 10. Vector image drawing means 46 is interposed between the image processing means 4 and the image outputting means 5.

The image vector converting means 42 converts a graphic image itself to vectors (vector conversion will be described later). The vector correcting means 43 corrects the contour vectors fed from the image vector converting means 42. The corrected contour vectors are used by the table recognizing means 44 for the recognition of a table structure. The vector image drawing means 46 draws the contour vector data corrected by the correcting means 43 in the image data processed by the image processing means 4.

Figures 14A, 14B:
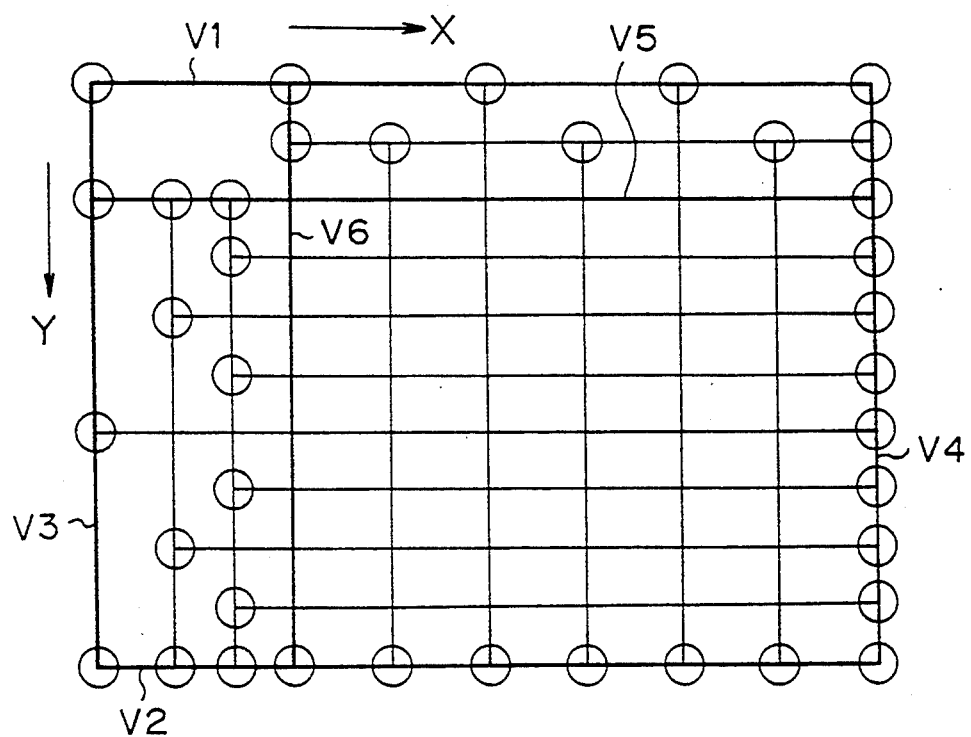
FIGS. 14A-14D demonstrate a sequence of area recognizing and image processing steps particular to the sixth embodiment.

Assume a document table shown in FIG. 14A which includes a table frame 47 (possibly handwritten). Again, the contour tracing means 9 and text/graphic discriminating means 10 produce contour data representative of a table frame image (see FIG. 11B). The image vector converting means 42 converts the frame line image itself to vectors and then erases the frame line image. Subsequently, if the table frame 47 is handwritten, the vector correcting means 43 combines the vectors in such a manner as to absorb irregularity particular to handwriting, or combines the vectors having been divided by the lines of the frame 47 at the time of vector conversion, or corrects nearly horizontal and nearly vertical vectors to produce horizontal and vertical vectors (how to correct will be described later). FIG. 14B shows the corrected vector data represented by thick lines and thin lines; circles indicate the end points (start points or terminal points) of vectors.

Subsequently, the table recognizing means 44 searches for, among the corrected contour vector data, four vectors representative of the outer contour, i.e., the minimum and maximum vectors V1 and V2 in the Y direction included in the horizontal or nearly horizontal vectors and the minimum and maximum vectors V3 and V4 in the X direction included in the vertical or nearly vertical vectors. The, the recognizing means 44 searches for vectors V5 and V6 having the same lengths as the vectors V1 and V2 and the vectors V3 and V4, respectively, and located at the second smallest positions in the X and Y directions, respectively. As a result, the recognizing means 44 determines that the area defined by the vectors V1, V3, V5 and V4 is the horizontal title zone T1 while the area defined by the vectors V1, V3, V2 and V6 is the vertical title zone T2.

Figures 14C, 14D:
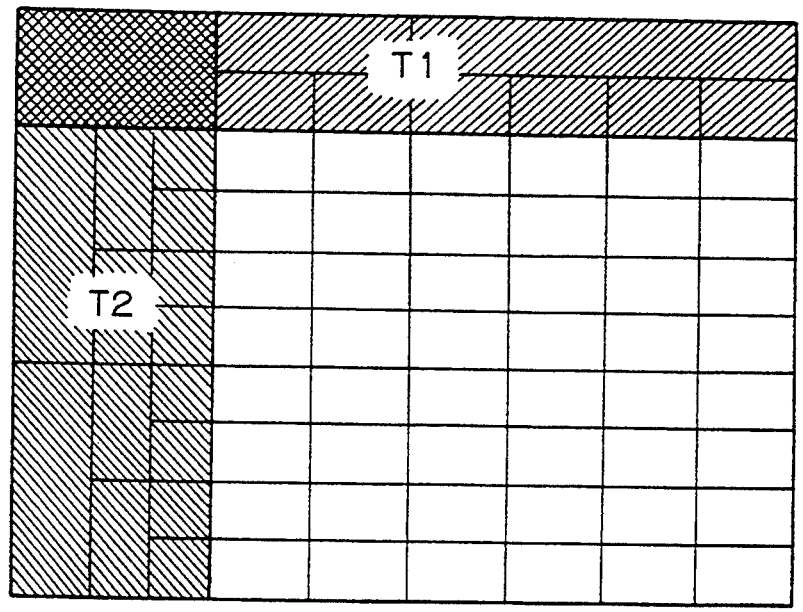

Thereafter, the operator enters a desired area and a desired processing mode on the selecting means 8. The operator may also enter a particular line width and a particular kind of line on the selecting means 8, as desired. In response, the image processing means 4 executes the designated processing with the designated area. Then, the vector image drawing means 46 draws corrected contour vector data in image data from the image vector means 42 and void of the frame lines with the line width and the kind of line entered on the selecting means 8. The resulting image is fed to the image outputting means 5. FIG. 14D shows a specific output image having part thereof outside of the title zones T1 and T2 erased and having the outer frame, the boundary lines of the title zones, the frame lines joining the outer frame at both ends thereof, and the other frame lines respectively represented by thick lines, double lines, medium lines, and thin lines.

Figure 15A:
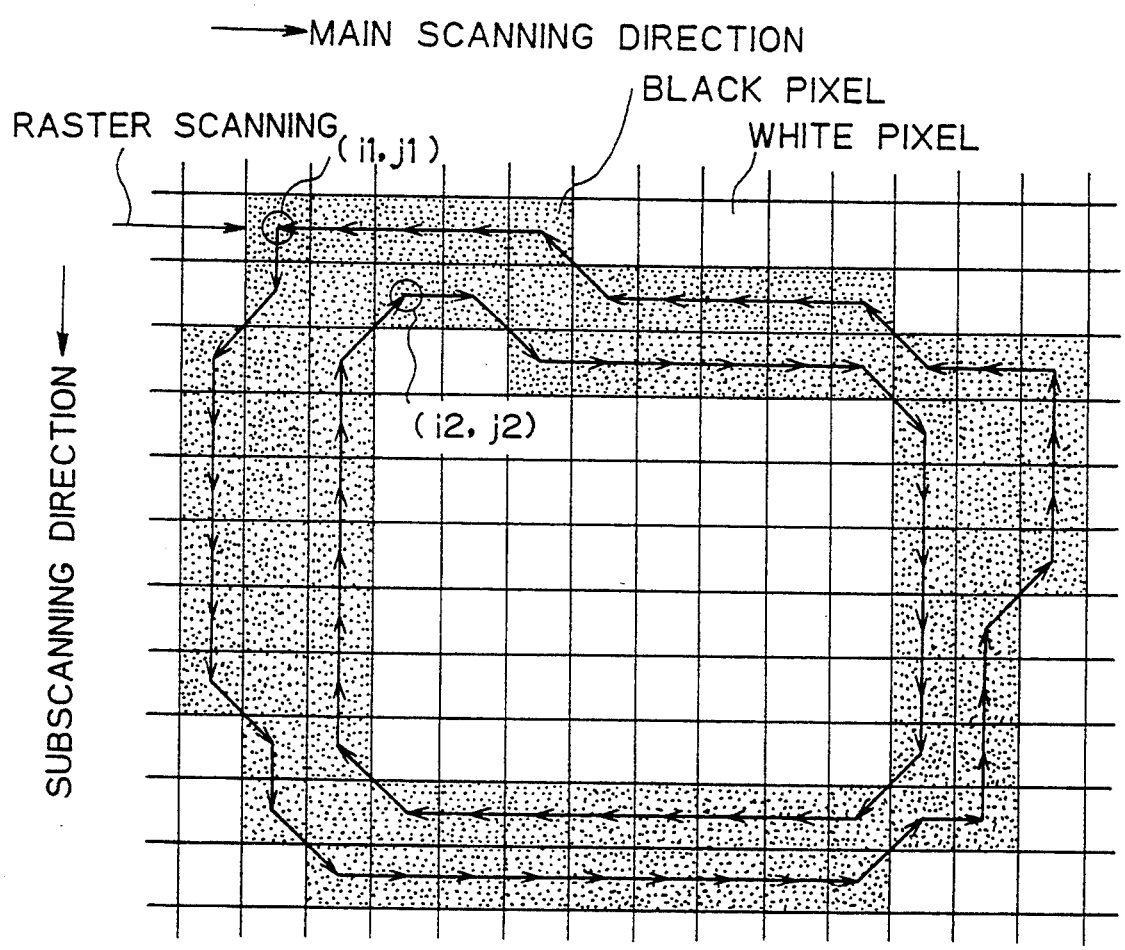
Figure 15B:
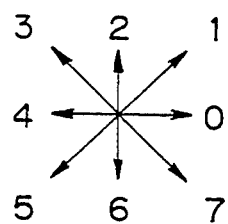

A reference will be made to FIGS. 15A, 15B and 16 for describing the various processing systems included in the embodiments specifically. To begin with, in the contour tracing procedure, the input image stored in the RAM 3 is scanned by raster scanning to find a black pixel for starting tracing. From the start pixel, the procedure sequentinly traces contour pixels counterclockwise in the case of an outer contour line or clockwise in the case of an inner contour line until it returns to the start pixel. This is the end of tracing of a single assembly of black pixels. Such a sequence of steps is repeated until all the contour pixels have been traced. The contour line is determined to be an outer contour line if the pixel positioned at the left of the start pixel (immediately preceding pixel in raster scanning) is a white pixel or determined to be an inner contour if it is a black pixel.

How to trace a contour will be described more specifically with reference to FIGS. 15A and 15B. As shown in FIG. 15B, a contour line is assumed to extend in any one of vertical, horizontal and oblique directions, i.e., eight directions 0–7. First, the start pixel is searched for by raster scanning, as shown in FIG. 15A. The start pixel is a pixel surrounded by eight pixels (directions 0–7.) including at least one white pixel and having not been traced yet. Here, a start pixel is found at a position (i1, j1). Since the pixel immediately preceding the start pixel (i1, j1) in the event of raster scanning is a white pixel, the contour line is determined to be an outer contour line and, therefore, the tracing operation starts in the counterclockwise direction. Then, the pixels surrounding the pixel (i1, j1) are examined counterclockwise from the left direction (direction 4), and the direction of a black pixel found first is determined to be the direction of the contour line. Subsequently, the start pixel is shifted to the black pixel having been found, and then the surrounding pixels are examined counterclockwise from the "direction −2 of the preceding contour line". Such a procedure is repeated until it reaches the start pixel again. As a result, the contour line represented by the outer loop shown in FIG. 15A is fully traced.

Thereafter, raster scanning is executed again at the position (i1, j1). The next start pixel is found at a position (i2, j2). Since the pixel immediately preceding the pixel (i2, j2) at the time of raster scanning is a black pixel, the contour line is determined to be an inner contour line. Therefore, tracing starts clockwise at the position (i2, j2). Then, pixels surrounding the pixel (i2, j2) are examined clockwise from the downward direction (direction 6), and the direction of a black pixel immediately preceding a white pixel found first is determined to be the direction of a contour line. Thereafter, the start pixel is shifted to the black pixel, and then pixels surrounding it are examined clockwise from the "direction +2 of the preceding contour line". This is repeated until the procedure reaches the start pixel again. As a result, a contour line represented by an inner loop in FIG. 15A is fully traced.

The result of tracing stated above is stored in the RAM 3 as contour data. As shown in FIG. 16, the contour data stored in the RAM 3 are implemented as the start positions and lengths of contour loops and identification flags for distinguishing inner and outer contours. The specific data shown in FIG. 16 are representative of the contours shown in FIG. 15A.

Text and graphic images are distinguished from each other, as follows. Whether an image inside of a contour line is noise, text image or graphic image is determined on the basis of, among contour data obtained by tracing, the sizes in the X and Y directions. The upper limit of the size of noise image and the upper limit of the size of text image are determined beforehand and assumed to be L1 and L2, respectively. Then, as shown in FIG. 17, an image whose lengths X and Y both are smaller than L1 is determined to be a noise image, an image whose lengths X and Y both are greater than L1 and smaller than L2 is determined to be a text image, and other images are determined to be graphic images. The resulting decision data are coded and sequentially registered, as shown in FIG. 8, in the order shown in FIG. 16.

In the event when a document image is read in a magnification change mode, the image cannot be accurately identified unless the values L1 and L2 are changed in matching relation to the magnification change ratio. For this reason, an operation represented by $L1' = L1 \times R$ and $L2' = L2 \times R$ (R being a magnification change ratio) is performed, and the resulting $L1'$ and $L2°$ are respectively substituted for L1 and L2 at the time of decision.

Regarding the inclusion relation, assume the document image shown in FIG. 3 by way of example. Then, as shown in FIG. 19, the minimum rectangular area including the outer contour has a top left point P1S and a bottom right point P1E, the minimum rectangular area defined by one of the inner contours has a top left point P2S and a bottom right point P2E, and the minimum rectangular area defined by the other inner contour has a top left point P3S and a bottom right point P3E. If P1S is smaller than or equal to P2S and P1E is greater than or equal to P2E, the inner contour 1 is determined to be included in the outer contour. If P1S is smaller than or equal to P3S and P1E is greater than or equal to P3E, the inner contour 2 is determined to be included in the outer contour. As a result, in the specific image shown in FIG. 19, the areas 1 and 2 delimited by the inner contours 1 and 2, respectively, are determined to be included in the outer.

Vector conversion is a procedure for replacing, among the chain code data produced by contour tracing (data represented by direction codes 0–7 of FIG. 15B), the data having continuous values with longer vectors while combining them within an allowable error range. Specifically, as shown in FIG. 20, assume that a certain contour point is selected as a start point, and that the end point of a vector is sequentially shifted along contour chain codes 48. Then, if the distance errors of intervening contour points relative to the associated vectors are not greater than an allowable error ds, the contour can be approximated by the vectors. This is successful in absorbing digital noise of contours and in reducing the amount of data representative of contours.

How to extract characteristic points is as follows. A characteristic point refers to a point where the difference between the angles of continuous vectors 49 sharply changes. Specifically, as shown in FIG. 21, when the difference $\theta_1$ between the angle of a certain vector 49a and that of a vector 49b contiguous with the vector 49a is greater than a predetermined threshold, the point 49ab where the vectors 49a and 49b join each other is extracted as a characteristic point.

Regarding vector conversion of an image, Papers of the Institute of Electronic and Communication Engineers of Japan, April 1985, Vol. J68-D, No. 4, pp. 845–852 and Japanese Patent Laid-Open Publication No. 286177/1987, for example, disclose a method of converting bilevel graphic line images. The method consists in tracing the contours of a graphic line image while determining the center line thereof, and representing the center line by broken line vectors by approximation. With such a method, it is possible to obtain line width data at the same time as the conversion of an image to vectors.

Regarding the correction of vectors, as shown in FIG. 22, assume vectors 50 connecting the start point of a certain vector 48a and the end point of a vector 48n. Then, if the distances between the end points of intervening vectos 48b, 48c and so forth and the vectors 50 are smaller than a predetermined allowable error $d_2$, the vectors 50 are determined to be corrected vectors undergone approximation.

Even when lines which are originally horizontal and vertical are slightly inclined due to the position of a document to be read, the embodiments correct the inclination also. Specifically, as shown in FIG. 23, when vectors 51 before correction are slightly deviated from the horizontal direction and if the deviation angle $\theta_2$ lies in an allowable range, the vectors 51 are corrected to the horizontal direction to become corrected vectors 52.

In summary, considering the fact that frame lines and table frames included in document images can replace marks to be entered by a marker pen, the present invention automatically extracts areas delimited by frame lines out of a document image as the candidates for selection by using area recognizing means which is made up of contour tracing means, text/graphic discriminating means, inclusion relation determining means, and area extracting means. All that is required is, therefore, to designate a desired area on selecting means. A document is, therefore, free from smears which would otherwise be caused by a marker pen. The second embodiment determines the size of each area defined by a contour line as a selection item, so that the operator may designate a desired area in terms of size on the selecting means. Hence, even when a document image includes a number of such areas, the second embodiment reduces the number of items to be selected on the selecting means, thereby promoting the ease of operation.

The third embodiment further includes fair image producing means using a vector system. Therefore, even when a document image includes handwritten frame lines, the embodiment produces fair frame lines together with a processed image.

The fourth embodiment recognizes even a table structure by table recognizing means included in the area recognizing means. The embodiment, therefore, readily implements image processing feasible for a table structure, e.g., erasing areas included in a table except for title zones. Especially, the fifth embodiment recognizes a table structure by using a contour vector system and a characteristic point extraction system and is, therefore, applicable even to a complicated table having a title zone subdivided into a plurality of subzones. The sixth embodiment not only copes with such a complicated structure but also reduces the amount of data and enhances rapid processing since it converts the frame line image of a table frame itself to vectors and then executes correction such as combination. In addition, since the sixth embodiment draws corrected vector data directly in processed image data, it is possible to converting a handwritten table frame to a fair table frame and to change the line width of a table frame.

Various modifications will become possible for those skilled in the art after receiving the teachings of the present disclosure without departing from the scope thereof.

What is claimed is:

1. An image processing device for writing into a storing means, a digital document image produced by image inputting means, for executing digital image processing with said digital document image stored in said storing means by image processing means to arrive at a processed digital document image, and for feeding the processed digital document image to image outputting means, said image processing device comprising
   a) area recognizing means including:
      1) contour tracing means for tracing contour lines included in said digital document image to produce image contour information;
      2) text/graphic discriminating means for determining whether said digital document image is a text image or a graphic image on the basis of the size of the contour of each portion of said digital document image represented by said image contour information;
      3) inclusion relation determining means for determining, when said digital document image is a graphic image, an inclusion relation between an outer contour and an inner contour with each other; and
      4) area extracting means for extracting areas each being delimited by a frame line on the basis of said determined inclusion relation; and
   b) selecting means for allowing an operator to select desired one of said areas and a content of desired processing.

2. A device as claimed in claim 1, further comprising fair image producing means, interposed between said image processing means and said outputting means, said fair image producing means including:

vector converting means for converting frame line image forming said areas extracted by said extracting means to vectors;

vector correcting means for correcting frame line data in the form of vectors produced by said vector converting means;

vector drawing means for developing the corrected vector data in an output memory connected to the said image outputting means;

image erasing means for erasing the original frame line image data in the form of vectors from said storing means; and image combining means for combining the image data from said image processing means and a frame line vector image from said vector drawing means.

3. An image processing device for writing into a storing means a digital document image produced by image inputting means, for executing digital image processing with said digital document image stored in said storing means by image processing means to arrive at a processed digital document image, and for feeding the processed digital document image to image outputting means, said image processing device comprising:

a) area recognizing means including:
1) contour tracing means for tracing contour lines included in said digital document image to produce image contour information;
2) text/graphic discriminating means for determining whether said digital document image is a text image or a graphic image on the basis of the size of the contour of each portion of said image represented by said image contour information;
3) inclusion relation determining means for determining, when said digital document image is a graphic image, an inclusion relation between an outer contour and an inner contour to thereby associate said outer contour and said inner contour with each other; and
4) area extracting means for extracting areas each being delimited by a frame line on the basis of said determined inclusion relation;

b) selecting means for allowing an operator to select the size of desired one of said extracted areas and a content of desired image processing; and c) area size determining means for determining the sizes of said areas to thereby identify said desired area entered on said selecting means.

4. A device as claimed in claim 3, further comprising fair image producing means, interposed between said image processing means and said image outputting means, said fair image producing means including:

vector converting means for converting frame line image forming said areas extracted by said area extracting means to vectors;

vector correcting means for correcting frame line data in the form of vectors produced by said vector converting means;

vector drawing means for developing the corrected vector data in an output memory connecting to said image outputting means;

image erasing means for erasing the original frame line image data in the form of vectors from said storing means; and image combining means for combining the image data from said image processing means a frame line vector image from said vector drawing means.

5. An image processing device for writing into a storing means, a digital document image produced by image inputting means, for executing digital image processing with said digital document image stored in said storing means by image processing means to arrive at a processed digital document image, and for feeding the processed digital document image to outputting means, said image processing device comprising:

a) area recognizing means including:
1) contour tracing means for tracing contour line included in said digital document image to produce image contour information;
2) text/graphic discriminating means for determining whether said digital document image is a text image or a graphic image on the basis of the size of the contour of each portion of said digital document image represented by said image contour information;
3) inclusion relation determining means for determining, when said digital document image is a graphic image, an inclusion relation between an outer contour and an inner contour to thereby associate said outer contour and said inner contour with each other;
4) area extracting means for extracting areas each being delimited by a frame line on the basis of said determined inclusion relation; and
5) table recognizing means for recognizing a table structure on the basis of a positional relation of said areas to one another; and b) selecting means for allowing an operator to select desired one of said areas out of said recognized table structure and a content of desired image processing.

6. An image processing device for writing into a storing means, a digital document image produced by image inputting means, for executing digital image processing with said digital document image stored in said storing means by imaged processing means to arrive at a processed digital document image, and for feeding the processed digital document image to image outputting means, said image processing device comprising:

a) area recognizing means including:
1) contour tracing means for tracing contour lines included in said digital document image to produce image contour information;
2) text/graphic discriminating means for determining whether said digital document image is a text image or a graphic image on the basis of the size of the contour of each portion of said digital document image represented by said image contour information;
3) vector converting means for converting, when said digital document image is a graphic image, contour data of said graphic image to vectors;
4) characteristic point extracting means for extracting a point where the continuity of contour vectors produced by said vector converting means changes as a characteristic point; and
5) table recognizing means for recognizing a table structure on the basis of said contour vectors and extracted characteristic points; and b) selecting means for allowing and operator to select a desired area out of said recognized table structure and a content of desired image processing.

7. An image processing device for writing into a storing means, a digital document image produced by image inputting means, for executing digital image processing with said digital document image stored in said storing means by image processing means to arrive at a processed digital document image, and for feeding the processed digital document image to image outputting means, said image processing device comprising:
a) area recognizing means including:
1) contour tracing means for tracing contour lines included in said digital document image to produce image contour information;
2) text/graphic discriminating means for determining whether said digital document image is a text image or a graphic image on the basis of the size of the contour of each portion of said digital document image represented by said image contour information;
3) vector converting means for converting, when said digital document image is a graphic image, said graphic image to vectors;
4) vector correcting means for correcting vector data produced by said vector converting means; and
5) table recognizing means for recognizing a table structure based on the corrected vector data;
b) selecting means for allowing an operator to select desired one of areas out of said table structure and a content of desired image processing; and
c) vector image drawing means for combining said corrected vector data with image data produced by said image processing means.

8. An image processing device comprising:
image reading means for reading a document image for producing image data;
contour tracing means for tracing contour lines included in said image data, to extract contour line loops;
text/graphic discriminating means for determining whether said image data is a text image or a graphic image, by comparing each of said contour line loops with a predetermined threshold;
inclusion relation determining means for determining, when said image data is a graphic image, an inclusion relation between inner and outer contours of said contour line loops;
area extracting means for extracting frame line areas each being delimited by a frame line on the basis of said determined inclusion relation;
designating means for designating a desired image processing; and
image processing means for executing said desired image processing designated by said designating means to said frame line areas.

9. A device as claimed in claim 8, further comprising:
vector converting means for converting frame line image data forming said frame line areas extracted by said area extracting means to vectors;
vector correcting means for correcting said frame line image data in the form of vectors produced by said vector converting means;
image erasing means for erasing said frame line image data in the form of vectors from said image data executed with said designated image processing; and
image combining means for combining said corrected frame line image data and said erased image data.

10. A device as claimed in claim 8, wherein said designating means includes:
means for designating the size of said frame line areas executed with said desired image processing.

11. A device as claimed in claim 10, further comprising:
area size determining means for determining the sizes of said frame line areas to thereby identify said designated size of said frame line areas.

12. An image processing device comprising:
image reading means for reading a document image for producing image data;
contour tracing means for tracing contour lines included in said image data to extract contour line loops;
text/graphic discriminating means for determining whether said image data is a text image or a graphic image, by comparing each of said contour lines loops with a predetermined threshold;
inclusion relation determining means for determining, when said image data is a graphic image, an inclusion relation between inner and outer contours of said contour line loops;
area extracting means for extracting frame line areas each being delimited by a frame line on the basis of said determined inclusion relation;
table recognizing means for recognizing a table structure on the basis of a positional relation of said frame line areas to one another;
designating means for designating one of said frame line areas out of said table structure and a desired image processing; and
image processing means for executing said desired image processing designated by said designating means to said one of said frame line areas.

13. An image processing device comprising:
image reading means for reading a document image for producing image data;
contour tracing means for tracing contour lines included in said image data to extract contour line loops;
text/graphic discriminating means for determining whether said image data is a text image or a graphic image, by comparing each of said contour line loops with a predetermined threshold;
vector converting means for converting, when said image data is a graphic image, said extracted contour line loops to vectors;
characteristic point extracting means for extracting a point where the continuity of contour vectors produced by said vector converting means changes as a characteristic point;
table recognizing means for recognizing a table structure on the basis of said contour vectors and said extracted characteristic points;
designating means for designating a desired area out of said table structure and a desired image processing; and
image processing means for executing said desired image processing designated by said designating means to image data in said desired area out of said table structure.

14. A device as claimed in claim 13, further comprising:
vector correcting means for correcting vector data produced by said vector converting means;
vector erasing means for erasing said vector data from said image data executed with said desired image processing; and
image combining means for combining said corrected vector data and said erased image data.

* * * * *